(12) United States Patent
Hayashi et al.

(10) Patent No.: US 10,728,880 B2
(45) Date of Patent: Jul. 28, 2020

(54) TERMINAL APPARATUS, BASE STATION APPARATUS, AND COMMUNICATION METHOD

(71) Applicant: SHARP KABUSHIKI KAISHA, Sakai, Osaka (JP)

(72) Inventors: Takashi Hayashi, Sakai (JP); Wataru Ouchi, Sakai (JP); Tatsushi Aiba, Sakai (JP); Shoichi Suzuki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/074,869

(22) PCT Filed: Feb. 2, 2017

(86) PCT No.: PCT/JP2017/003855
§ 371 (c)(1),
(2) Date: Aug. 2, 2018

(87) PCT Pub. No.: WO2017/135385
PCT Pub. Date: Aug. 10, 2017

(65) Prior Publication Data
US 2019/0059075 A1 Feb. 21, 2019

(30) Foreign Application Priority Data
Feb. 4, 2016 (JP) ................................. 2016-019536

(51) Int. Cl.
*H04W 72/04* (2009.01)
*H04L 5/00* (2006.01)
(Continued)

(52) U.S. Cl.
CPC .......... *H04W 72/04* (2013.01); *H04L 5/0092* (2013.01); *H04L 27/2602* (2013.01); *H04W 48/10* (2013.01)

(58) Field of Classification Search
CPC ... H04L 1/0007; H04L 5/0051; H04L 5/0092; H04L 5/0098; H04L 27/2602;
(Continued)

(56) References Cited

U.S. PATENT DOCUMENTS

2010/0290405 A1 11/2010 Arnott et al.
2012/0243505 A1* 9/2012 Lin ....................... H04L 5/0051
370/331

(Continued)

FOREIGN PATENT DOCUMENTS

JP 2015-180096 A 10/2015
WO 2016/130175 A1 8/2016

OTHER PUBLICATIONS

Ericsson, "5G—key component of the Networked Society", RWS-150009, 3GPP RAN Workshop on 5G, Phoenix, AZ, USA, Sep. 17-18, 2015.
(Continued)

*Primary Examiner* — Khoa Huynh
(74) *Attorney, Agent, or Firm* — ScienBiziP, P.C.

(57) ABSTRACT

To provide a terminal apparatus, a base station apparatus, and a communication method that enable a communication apparatus (terminal apparatus and/or base station apparatus) supporting multiple subcarrier spacings to perform efficient communication. A terminal apparatus includes: a reception unit configured to receive a control channel with a control information format including a first field and a second field; a reception control unit configured to identify a subcarrier spacing, based on a value of the first field; and a reception unit configured to receive a data channel assigned based on a value of the second field by using the identified subcarrier spacing.

8 Claims, 25 Drawing Sheets

(51) Int. Cl.
*H04L 27/26* (2006.01)
*H04W 48/10* (2009.01)

(58) Field of Classification Search
CPC ............. H04W 72/04; H04W 72/0406; H04W 72/042; H04W 72/0453; H04W 72/0466; H04W 48/10
See application file for complete search history.

(56) References Cited

U.S. PATENT DOCUMENTS

2017/0290008 A1* 10/2017 Tooher .................. H04L 1/0007
2018/0007673 A1 1/2018 Fwu et al.

OTHER PUBLICATIONS

3GPP TS 36.213 V13.0.1 3rd Generation Partnership Project; Technical Specification Group Radio Access Network; Evolved Universal Terrestrial Radio Access (E-UTRA); Physical layer procedures(Release 13) (Jan. 2016).
Intel Corporation, "On Downlink HARQ-ACK feedback for NB-IoT", R1-160133, 3GPP TSG RAN WG1 NB-IoT Ad-Hoc Meeting, Jan. 18-20, 2016.
Intel Corporation, "On physical layer design for NB-IoT", R1-155854, 3GPP TSG RAN WG1 Meeting #82bis, Oct. 5-9, 2015.

* cited by examiner (1) EXAMPLE OF SELF SCHEDULING
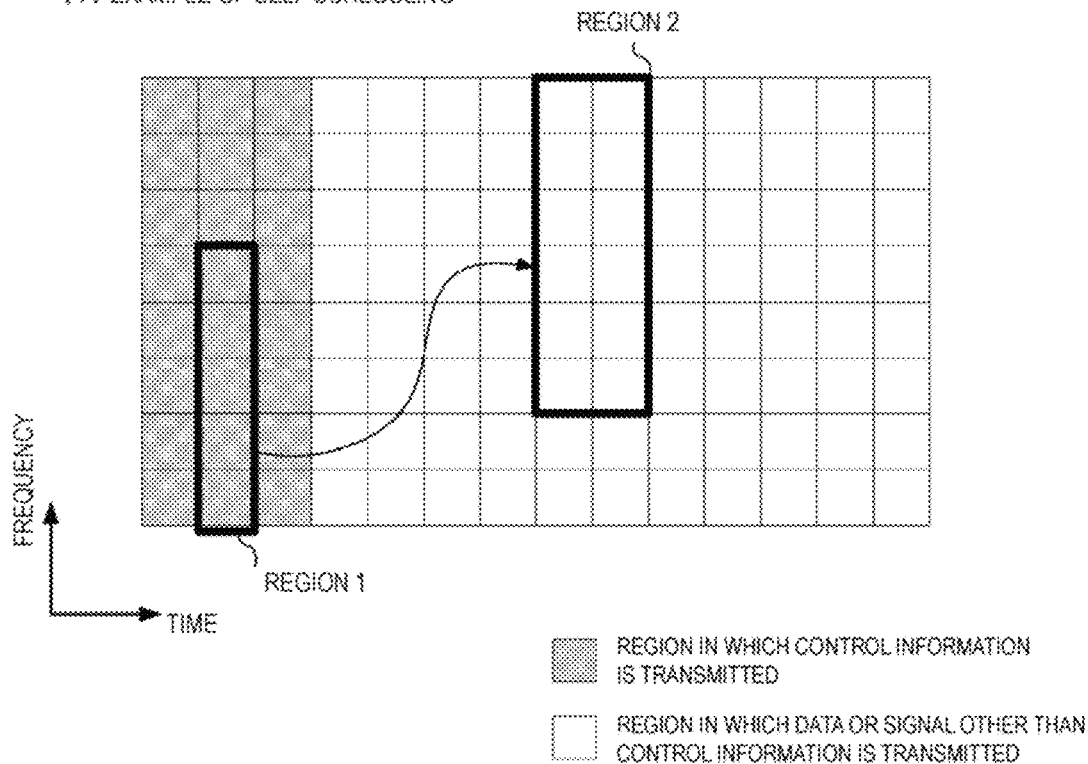
(2) EXAMPLE OF SELF SCHEDULING
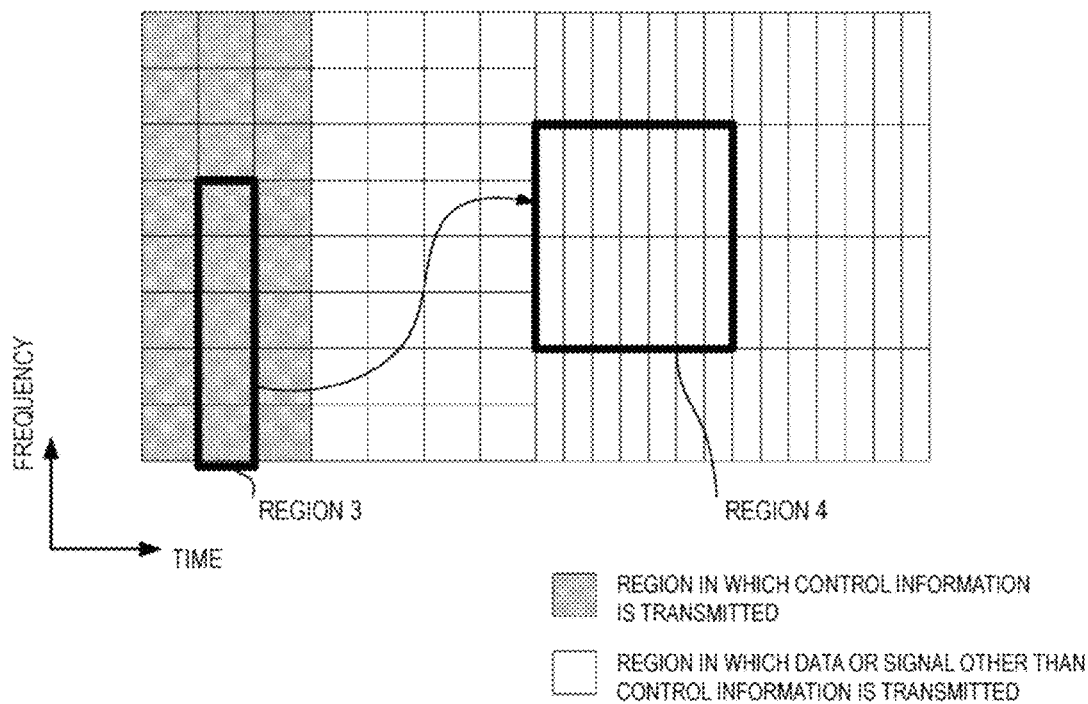
FIG. 13

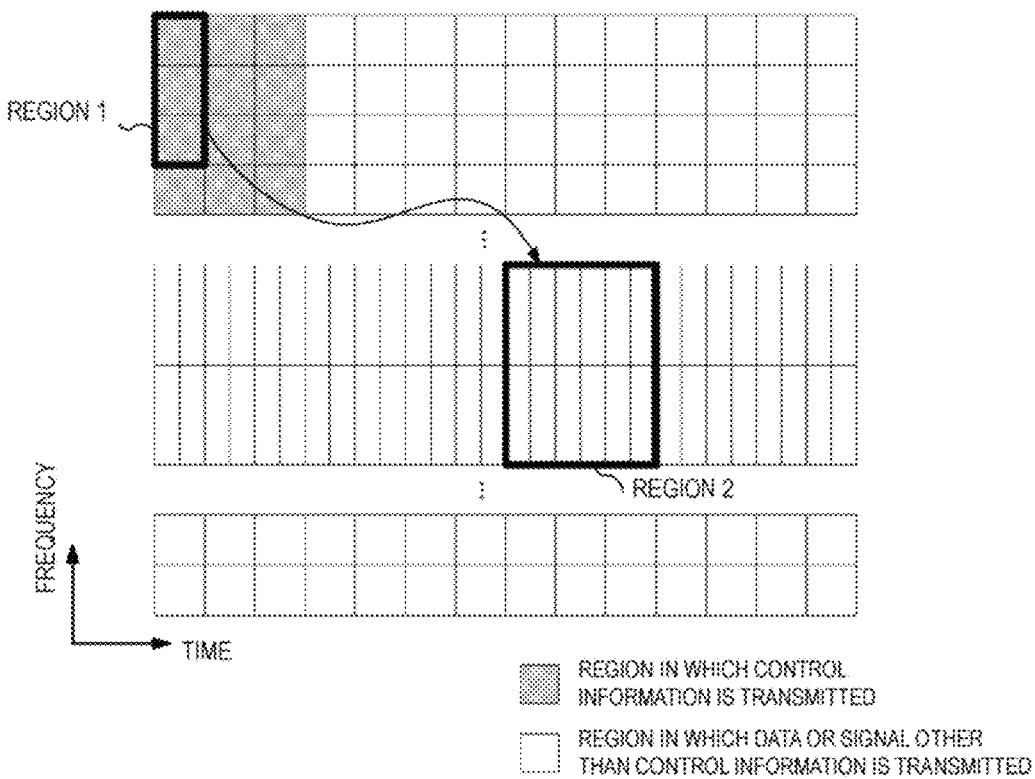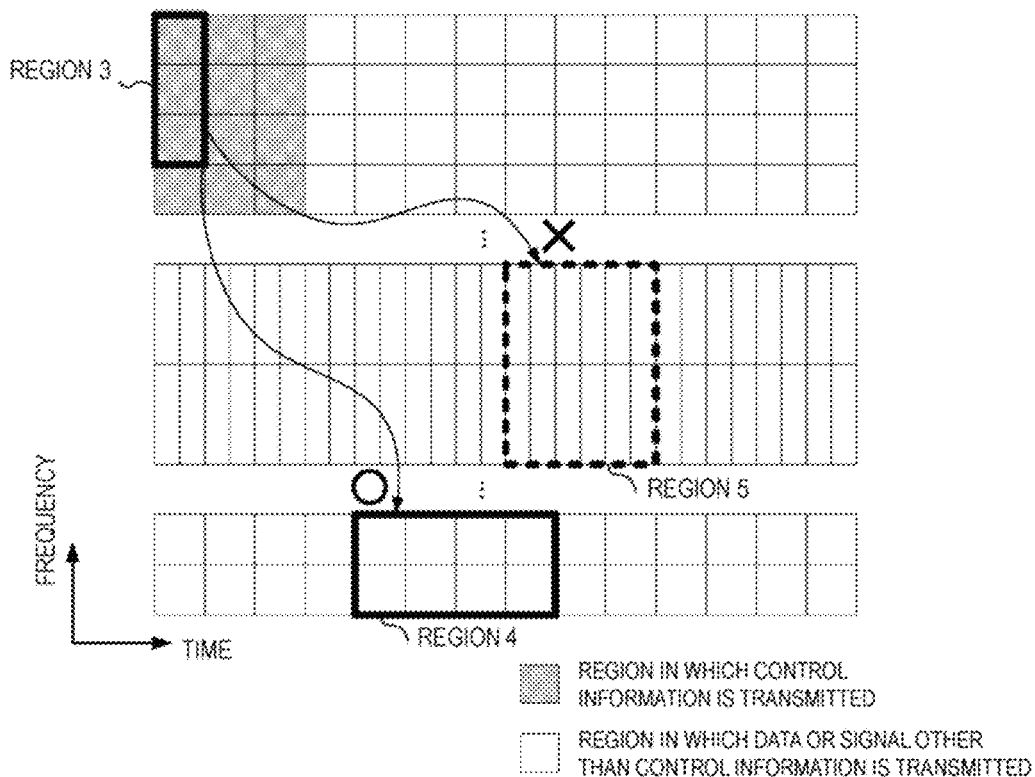
FIG. 14

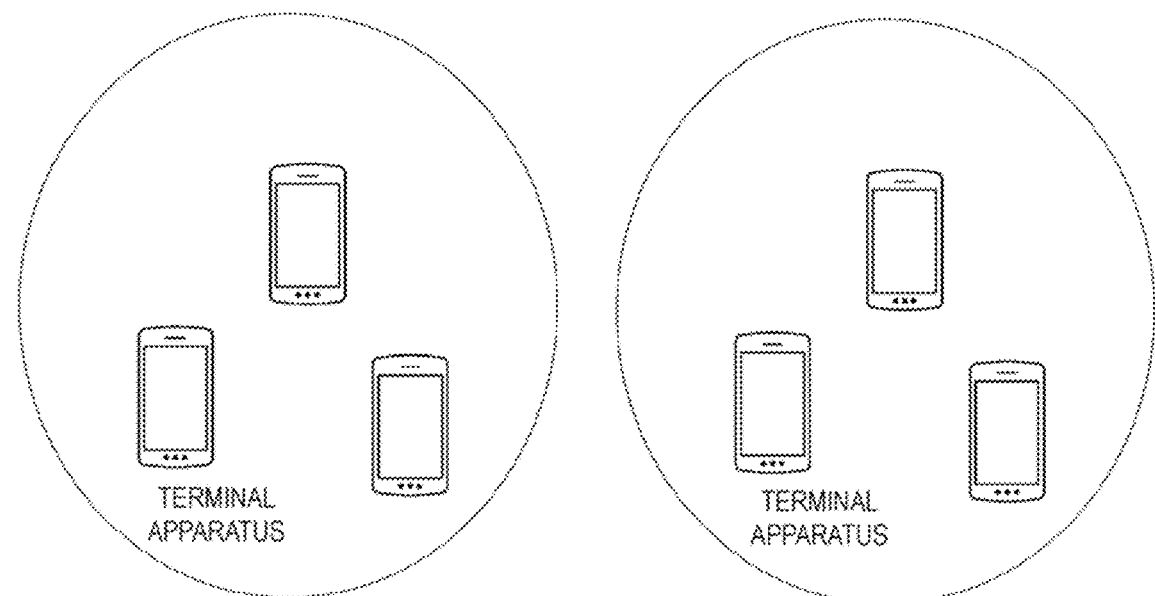
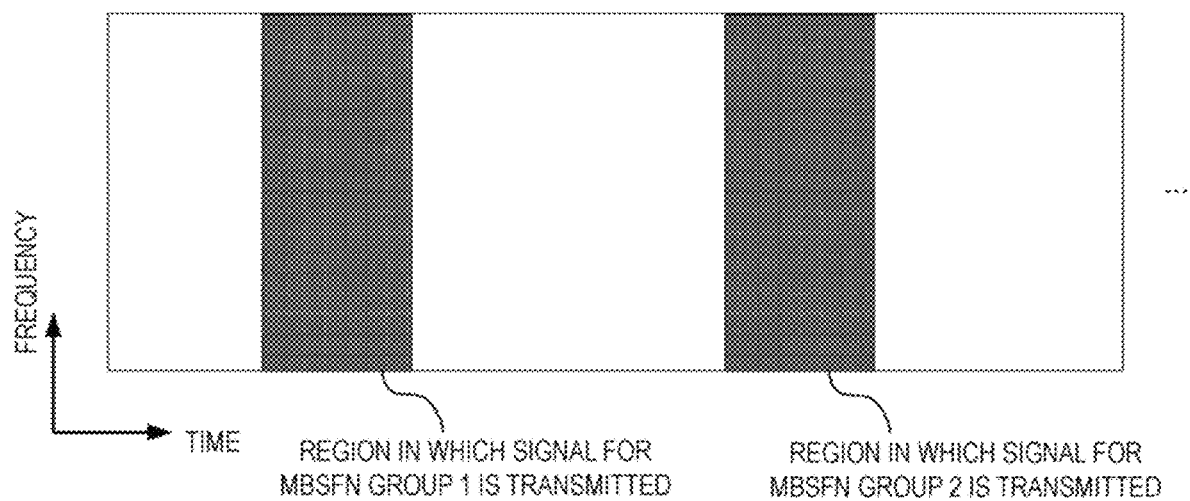
FIG. 16

| Index | Subcarrier spacing |
|-------|--------------------|
| 0 | 15 kHz |
| 1 | 75 kHz |
| 2 | 540 kHz |

...

| | |
|---|---|
| i | 600 kHz |

FIG. 17

| Operation mode | Subcarrier spacing |
|---|---|
| 0 | 15 kHz |
| 1 | 75 kHz |
| 2 | 540 kHz |
| ... | ... |
| i | 600 kHz |

FIG. 18

| Index (Operation mode) | Subcarrier spacing |
|---|---|
| 0 | {15, 75, 540, 600} kHz |
| 1 | {15, 75, 540} kHz |
| 2 | {15, 75} kHz |
| ... | ... |
| i | {15} kHz |

FIG. 19

| Operating Band | Uplink (UL) operating band BS receive UE transmit | Downlink (DL) operating band BS transmit UE receive | Duplex Mode (Frame structure type) | Subcarrier spacing |
|---|---|---|---|---|
| 1 | 1920 MHz – 1980 MHz | 2110 MHz – 2170 MHz | FDD (type 1) | 540 kHz |
| 2 | 1850 MHz – 1910 MHz | 1930 MHz – 1990 MHz | FDD (type 1) | 75 kHz |
| 3 | 1710 MHz – 1785 MHz | 1805 MHz – 1880 MHz | FDD (type 1) | 15 kHz |

...

| | | | | |
|---|---|---|---|---|
| 42 | 3400 MHz – 3600 MHz | 3400 MHz – 3600 MHz | TDD (type 2) | 540 kHz |
| 43 | 3600 MHz – 3800 MHz | 3600 MHz – 3800 MHz | TDD (type 2) | 75 kHz |
| 44 | 703 MHz – 803 MHz | 703 MHz – 803 MHz | TDD (type 2) | 15 kHz |
| 45 | 5150 MHz – 5250 MHz | 5150 MHz – 5250 MHz | LAA (type 3) | 540 kHz |

FIG. 20

| Operating Band | Uplink (UL) operating band BS receive UE transmit | Downlink (DL) operating band BS transmit UE receive | Duplex Mode (Frame structure type) | Subcarrier spacing |
|---|---|---|---|---|
| 1 | 1920 MHz – 1980 MHz | 2110 MHz – 2170 MHz | FDD (type 1) | {15, 75, 540, 600} kHz |
| 2 | 1850 MHz – 1910 MHz | 1930 MHz – 1990 MHz | FDD (type 1) | {540, 600} kHz |
| 3 | 1710 MHz – 1785 MHz | 1805 MHz – 1880 MHz | FDD (type 1) | 15 kHz |

...

| | | | | |
|---|---|---|---|---|
| 42 | 3400 MHz – 3600 MHz | 3400 MHz – 3600 MHz | TDD (type 2) | {15, 600} kHz |
| 43 | 3600 MHz – 3800 MHz | 3600 MHz – 3800 MHz | TDD (type 2) | {15, 75} kHz |
| 44 | 703 MHz – 803 MHz | 703 MHz – 803 MHz | TDD (type 2) | {540, 600} kHz |
| 45 | 5150 MHz – 5250 MHz | 5150 MHz – 5250 MHz | LAA (type 3) | {540, 600} kHz |

FIG. 21

| Operating Band | Uplink (UL) operating band BS receive UE transmit | Downlink (DL) operating band BS transmit UE receive | Duplex Mode (Frame structure type) | Subcarrier spacing for UL operating band | Subcarrier spacing for DL operating band |
|---|---|---|---|---|---|
| 1 | 1920 MHz – 1980 MHz | 2110 MHz – 2170 MHz | FDD (type 1) | 540 kHz | 540 kHz |
| 2 | 1850 MHz – 1910 MHz | 1930 MHz – 1990 MHz | FDD (type 1) | 75 kHz | 15 kHz |
| 3 | 1710 MHz – 1785 MHz | 1805 MHz – 1880 MHz | FDD (type 1) | 15 kHz | 75 kHz |
| ... | | | | | |
| 42 | 3400 MHz – 3600 MHz | 3400 MHz – 3600 MHz | TDD (type 2) | 540 kHz | 540 kHz |
| 43 | 3600 MHz – 3800 MHz | 3600 MHz – 3800 MHz | TDD (type 2) | 75 kHz | 15 kHz |
| 44 | 703 MHz – 803 MHz | 703 MHz – 803 MHz | TDD (type 2) | 540 kHz | 15 kHz |
| 45 | 5150 MHz – 5250 MHz | 5150 MHz – 5250 MHz | LAA (type 3) | 540 kHz | 540 kHz |

FIG. 24

| Operating Band | Uplink (UL) operating band BS receive UE transmit | Downlink (DL) operating band BS transmit UE receive | Duplex Mode (Frame structure type) | Subcarrier spacing for UL operating band | Subcarrier spacing for DL operating band |
|---|---|---|---|---|---|
| 1 | 1920 MHz – 1980 MHz | 2110 MHz – 2170 MHz | FDD (type 1) | {15, 75, 540, 600} kHz | {15, 75, 540, 600} kHz |
| 2 | 1850 MHz – 1910 MHz | 1930 MHz – 1990 MHz | FDD (type 1) | {540, 600} kHz | {15, 75, 540, 600} kHz |
| 3 | 1710 MHz – 1785 MHz | 1805 MHz – 1880 MHz | FDD (type 1) | 15 kHz | {540, 600} kHz |
| ... | | | | | |
| 42 | 3400 MHz – 3600 MHz | 3400 MHz – 3600 MHz | TDD (type 2) | {15, 600} kHz | {15, 600} kHz |
| 43 | 3600 MHz – 3800 MHz | 3600 MHz – 3800 MHz | TDD (type 2) | {540, 600} kHz | {15, 75} kHz |
| 44 | 703 MHz – 803 MHz | 703 MHz – 803 MHz | TDD (type 2) | {75, 540, 600} kHz | {540, 600} kHz |
| 45 | 5150 MHz – 5250 MHz | 5150 MHz – 5250 MHz | LAA (type 3) | {540, 600} kHz | {15, 75, 600} kHz |

FIG. 25

TERMINAL APPARATUS, BASE STATION APPARATUS, AND COMMUNICATION METHOD

TECHNICAL FIELD

Embodiments of the present invention relate to a technique of a terminal apparatus, a base station apparatus, and a communication method that enable efficient communication.

BACKGROUND ART

The 3rd Generation Partnership Project (3GPP), which is a standardization project, standardized the Evolved Universal Terrestrial Radio Access (hereinafter, referred to as E-UTRA), in which high-speed communication is realized by adopting an Orthogonal Frequency-Division Multiplexing (OFDM) communication scheme and flexible scheduling using a unit of prescribed frequency and time called resource block.

Moreover, the 3GPP discusses Advanced E-UTRA, which realizes higher-speed data transmission and has upper compatibility with E-UTRA, E-UTRA relates to a communication system based on a network in which base station apparatuses have substantially the same cell configuration (cell size); however, regarding Advanced E-UTRA, discussion is made on a communication system based on a network (different-type radio network, Heterogeneous Network) in which base station apparatuses (cells) having different configurations coexist in the same area. In this regard, E-UTRA is also referred to as "Long Term Evolution (LTE)", and Advanced E-UTRA is also referred to as "LTE-Advanced". Furthermore, LTE may be a collective name including LTE-Advanced.

Further, in the 3GPP, proposal has been made for the fifth generation communication (NPL 1). The fifth generation radio communication technology/fifth generation radio access technology are sometimes referred to as NX or Next Generation Radio Access Technology (NGRAT).

CITATION LIST

Non Patent Literature

NPL 1: RWS-150009, Ericsson, 3GPP RAN Workshop on 5G, 17-18 Sep. 2015.

SUMMARY OF INVENTION

Technical Problem

The present invention provides a terminal apparatus, a base station apparatus, and a communication method that enable a communication apparatus (terminal apparatus and/or base station apparatus) supporting multiple subcarrier spacings to perform efficient communication.

Solution to Problem

A terminal apparatus according to an aspect of the invention includes: a reception unit configured to receive a control channel with a control information format including a first field and a second field; a reception control unit configured to identify a subcarrier spacing, based on a value of the first field; and a reception unit configured to receive a data channel assigned based on a value of the second field by using the identified subcarrier spacing.

A base station apparatus according to an aspect of the present invention includes: a transmission unit configured to transmit a control channel with a control information format including a first field and a second field; and a transmission unit configured to transmit a data channel assigned based on a value of the second field by using a subcarrier spacing based on a value of the first field.

A communication method for a terminal apparatus according to an aspect of the invention includes the steps of: receiving a control channel with a control information format including a first field and a second field; identifying a subcarrier spacing, based on a value of the first field; and receiving a data channel assigned based on a value of the second field by using the identified subcarrier spacing.

A communication method for a base station apparatus according to an aspect of the present invention includes the steps of: transmitting a control channel with a control information format including a first field and a second field; and transmitting a data channel assigned based on a value of the second field by using a subcarrier spacing based on a value of the first field.

Advantageous Effects of Invention

According to the present embodiment, a communication apparatus (terminal apparatus and/or base station apparatus) supporting multiple subcarrier spacings can efficiently communicate.

BRIEF DESCRIPTION OF DRAWINGS

FIG. 13 is a diagram illustrating an example of scheduling according to the present embodiment.

FIG. 14 is a diagram illustrating an example of the scheduling according to the present embodiment.

FIG. 16 is a diagram illustrating an example of a multicast data transmission method according to the present embodiment.

FIG. 17 is a diagram illustrating an example of a table managing subcarrier spacings according to the present embodiment.

FIG. 18 is a diagram illustrating an example of the table managing subcarrier spacings according to the present embodiment.

FIG. 19 is a diagram illustrating an example of the table managing subcarrier spacings according to the present embodiment.

FIG. 20 is a diagram illustrating an example of the table managing subcarrier spacings according to the present embodiment.

FIG. 21 is a diagram illustrating an example of the table managing subcarrier spacings according to the present embodiment.

FIG. 24 is a diagram illustrating an example of the table managing subcarrier spacings according to the present embodiment.

FIG. 25 is a diagram illustrating an example of the table managing subcarrier spacings according to the present embodiment.

DESCRIPTION OF EMBODIMENTS

First Embodiment

A first embodiment of the present invention will be described below. A description will be given by using a communication system (cellular system) in which a base station apparatus (base station, NodeB, or eNodeB (eNB)) and a terminal apparatus (terminal, mobile station, user device, or User equipment (UE)) communicate in a cell.

In the present embodiment, "X/Y" includes the meaning of "X or Y". In the present embodiment, "X/Y" includes the meaning of "X and Y". In the present embodiment, "X/Y" includes the meaning of "X and/or Y".

In the description of the present embodiment, a description of downlink covers downlink in a normal cell and downlink in a LAA cell. For example, a description of a downlink subframe includes a downlink subframe in a normal cell, a full subframe in a LAA cell, and a partial subframe in a LAA cell.

A physical channel and a physical signal substantially used in EUTRA and Advanced EUTRA will be described. The "channel" refers to a medium used to transmit a signal, and the "physical channel" refers to a physical medium used to transmit a signal. In the present embodiment, the physical channel may be used synonymously with "signal". In the future EUTRA and Advanced EUTRA, the physical channel may be added or its constitution and format type may be changed or added; however, the description of the present embodiment will not be affected even if such change or addition is made.

Figure 1:
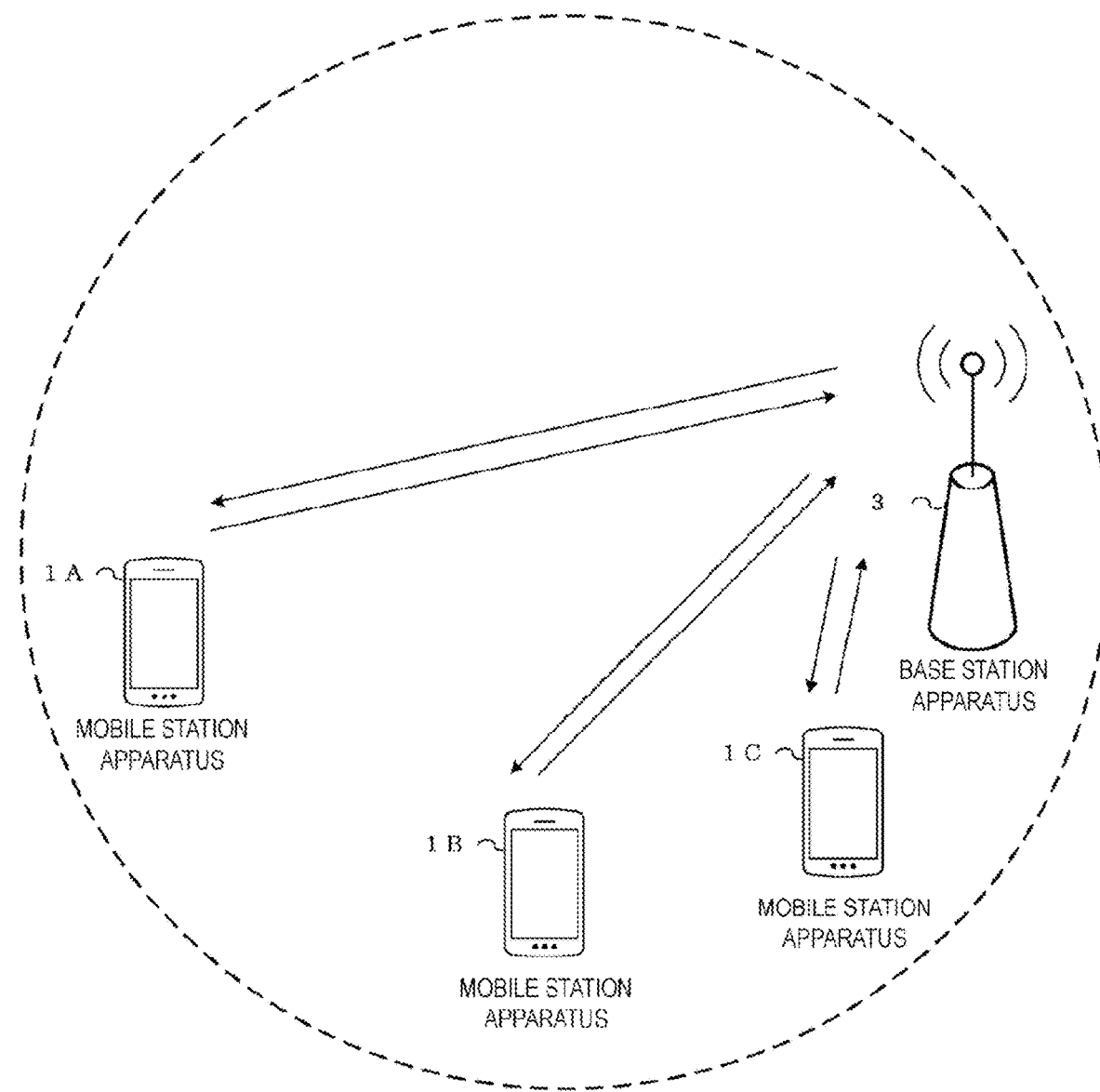
FIG. 1 is a conceptual diagram illustrating an example of a radio communication system according to a present embodiment.

FIG. 1 is a conceptual diagram of a radio communication system according to the present embodiment. In FIG. 1, the radio communication system includes terminal apparatuses 1A to 1C and a base station apparatus 3. For explanation, the terminal apparatuses 1A to 1C are simply referred to as a terminal apparatus in the present embodiment. For explanation, the base station apparatus 3 is simply referred to as a base station apparatus in the present embodiment.

The present embodiment may be applied to an RRC_CONNECTED state or only to the terminal apparatus in an RRC_CONNECTED mode. The present embodiment may be applied to an RRC_IDLE state or only to the terminal apparatus in the RRC_IDLE state. The present embodiment may be applied to both the RRC_CONNECTED state or the terminal apparatus in the RRC_ONNECTED mode and the RRC_IDLE state or the terminal apparatus in the RRC_IDLE state.

In the present embodiment, one serving cell is configured for the terminal apparatus. The one serving cell may be a primary cell. The one serving cell may be a cell on which the terminal apparatus is camping. The primary cell is a cell in which an initial connection establishment procedure has been performed, a cell in which a connection re-establishment procedure has started, or a cell indicated as a primary cell in a handover procedure.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier. in FDD, the uplink component carrier and the downlink component carrier correspond to different carrier frequencies. In TDD, the uplink component carrier and the downlink component carrier correspond to the same carrier frequency.

In the downlink, one independent HARQ entity exists for each serving cell (downlink component carrier). The HARQ entity manages multiple HARQ processes in parallel. Each of the HARQ processes indicates a physical layer to receive data, based on a received downlink assignment (downlink control information).

In the downlink, at least one transport block is generated for each of one or multiple Transmission Time Intervals (TTIs) for each serving cell. The transport block and HARQ retransmission of the transport block are mapped to one serving cell. Note that, in LTE, a TTI serves as a subframe. The transport block in the downlink is MAC layer data transmitted on the Downlink Shared CHannel (DL-SCH).

In the present embodiment, in the downlink, "transport block", "MAC Protocol Data Unit (PDU)", "MAC layer data", "DL-SCH", "DL-SCH data", and "downlink data" are assumed to mean the same.

Figure 2:
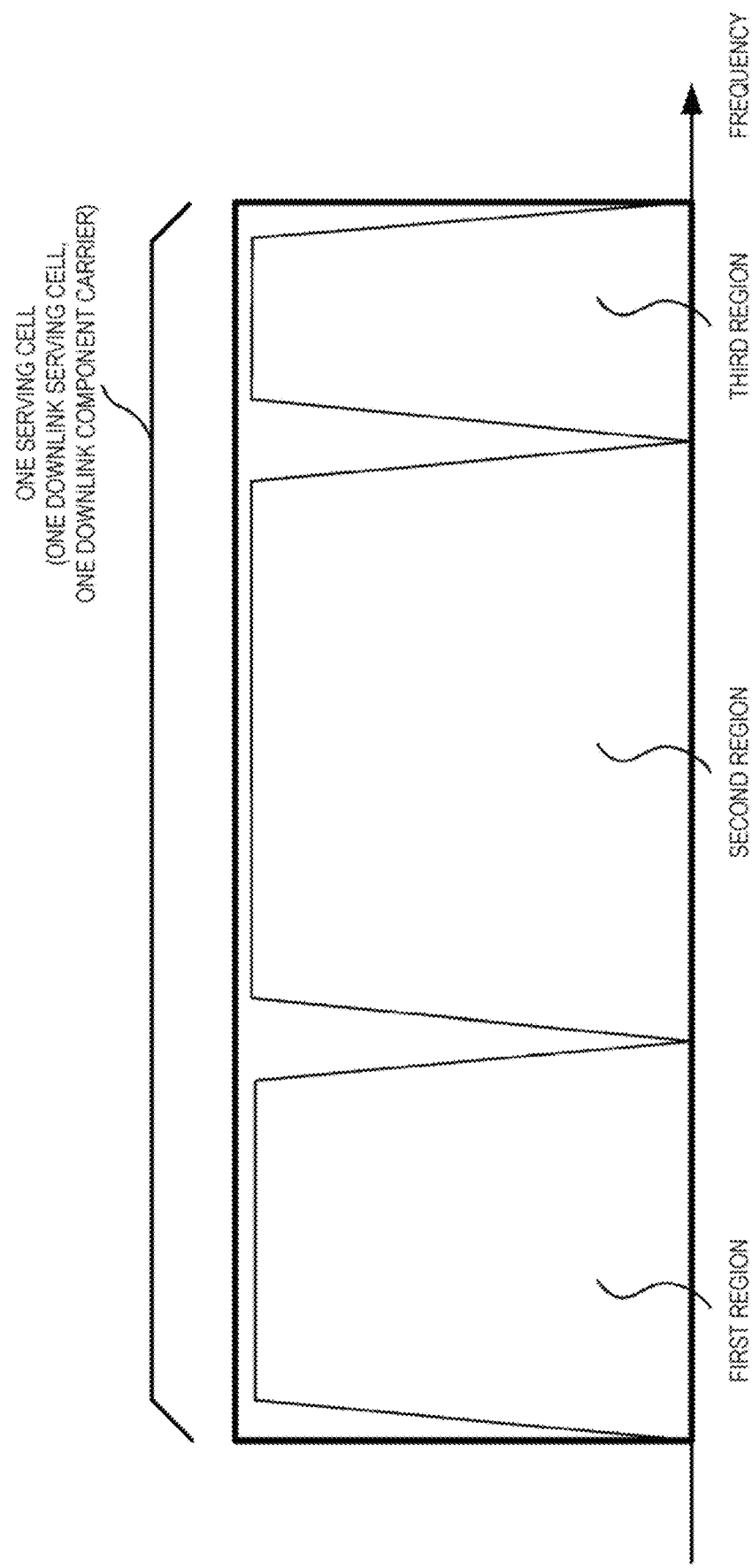
FIG. 2 is a diagram illustrating an example of a serving cell according to the present embodiment.

FIG. 2 is an example of a serving cell according to the present embodiment. The serving cell in FIG. 2 may be rephrased as a downlink serving cell, downlink component carrier, or the like. One serving cell may include multiple regions. FIG. 2 illustrates an example in which three regions are included in one serving cell. Although not illustrated, a guard frequency may be present between the regions. Although not illustrated, the regions may overlap each other. In other words, no guard frequency may be present between the regions. The number of regions included in one serving cell may be limited. For example, the number of regions included in one serving cell may be limited to up to five. The regions included in one serving cell may include a region used for downlink transmission and a region used for uplink transmission. For example, a first region and a second region may be used for downlink transmission, and a third region may be used for uplink transmission.

Different subcarrier spacings may be applied to the respective regions included in one serving cell. For example, a first subcarrier spacing may be applied to the first region, a second subcarrier spacing may be applied to the second region, and a third subcarrier spacing may be applied to the third region. The subcarrier spacings applied to the regions may be determined based on some of or all Element (1) to Element (4) to be described later.

Moreover, the terminal apparatus and the base station apparatus may employ a technique for aggregating the frequencies (serving cells, cells, component carriers, or frequency bands) of multiple different frequency bands through carrier aggregation and treating the resultant as a single frequency (frequency band). Component carriers are categorized into an uplink component carrier corresponding to the uplink and a downlink component carrier corresponding to the downlink. The carrier aggregation may be referred to as cell aggregation.

For example, in a case that each of five component carriers having a frequency bandwidth of 20 MHz are aggregated through carrier aggregation, a terminal apparatus capable of performing carrier aggregation performs transmission and/or reception by assuming that the aggregated carrier has a frequency bandwidth of 100 MHz. Note that component carriers to be aggregated may have contiguous frequencies or frequencies some or all of which are discontiguous. For example, assuming that available frequency bands are an 800 MHz band, a 2 GHz band, and a 3.5 GHz band, a component carrier may be transmitted in the 800 MHz band, another component carrier may be transmitted in the 2 GHz band, and yet another component carrier may be transmitted in the 3.5 GHz band.

It is also possible to aggregate multiple contiguous or discontiguous component carriers of the same frequency band. The frequency bandwidth of each component carrier may be narrower (e.g., 5 MHz or 10 MHz) than the receivable frequency bandwidth (e.g., 20 MHz) of the terminal apparatus, and the frequency bandwidth of component carriers to be aggregated may be different from each other. Each frequency bandwidth is preferably equal to any of the frequency bandwidth of known cells in consideration of backward compatibility, but may be a frequency bandwidth different from any of the frequency bands of the known cells.

Figure 3:
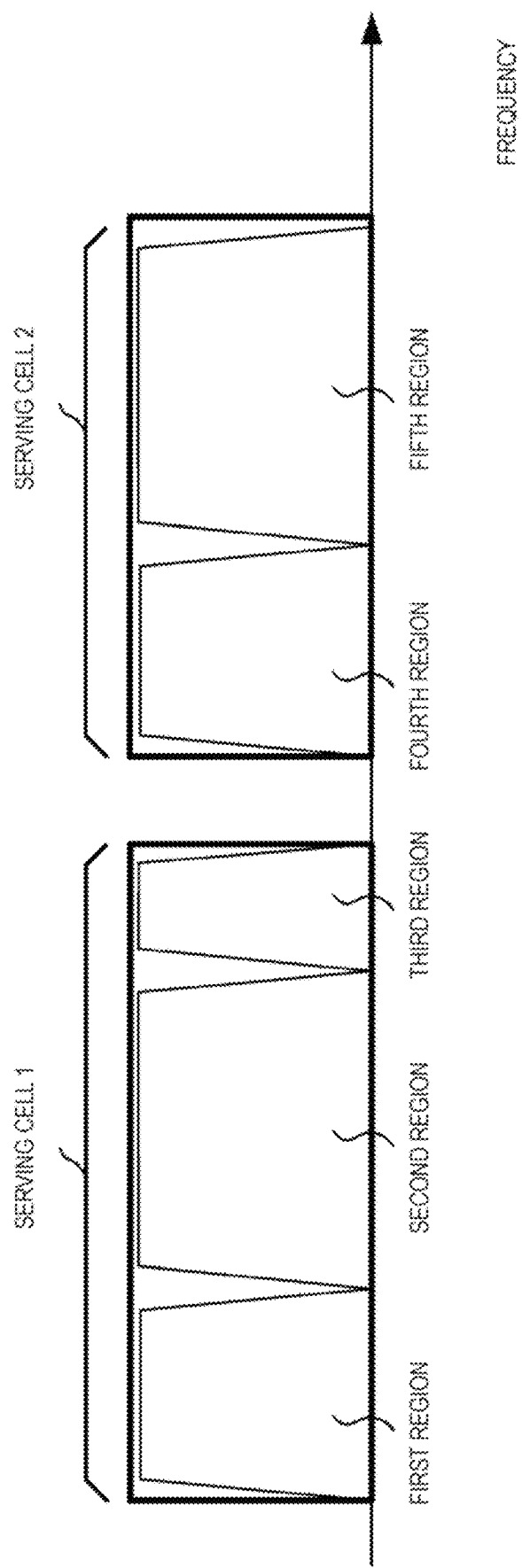
FIG. 3 is a diagram illustrating an example of carrier aggregation according to the present embodiment.

FIG. 3 is an example of carrier aggregation according to the present embodiment. FIG. 3 is an example in which a serving cell 1 and a serving cell 2 are aggregated. The serving cell 1 includes the first region to the third region, and the serving cell 2 includes a fourth region and a fifth region.

It is preferable that any one of serving cells among the multiple serving cells thus aggregated be a primary cell, and the serving cells other than the primary cell among the multiple serving cell thus aggregated may be secondary cells. For example, the serving cell 1 may be a primary cell, and the serving cell 2 may be a secondary cell. One region in the primary cell may be a primary region. The primary region may also be present in the secondary cell. For example, the first region in the serving cell 1, which is the primary cell, may be a primary region, and the fourth region in the serving cell 2, which is the secondary cell, may be a primary secondary region.

Figure 4:
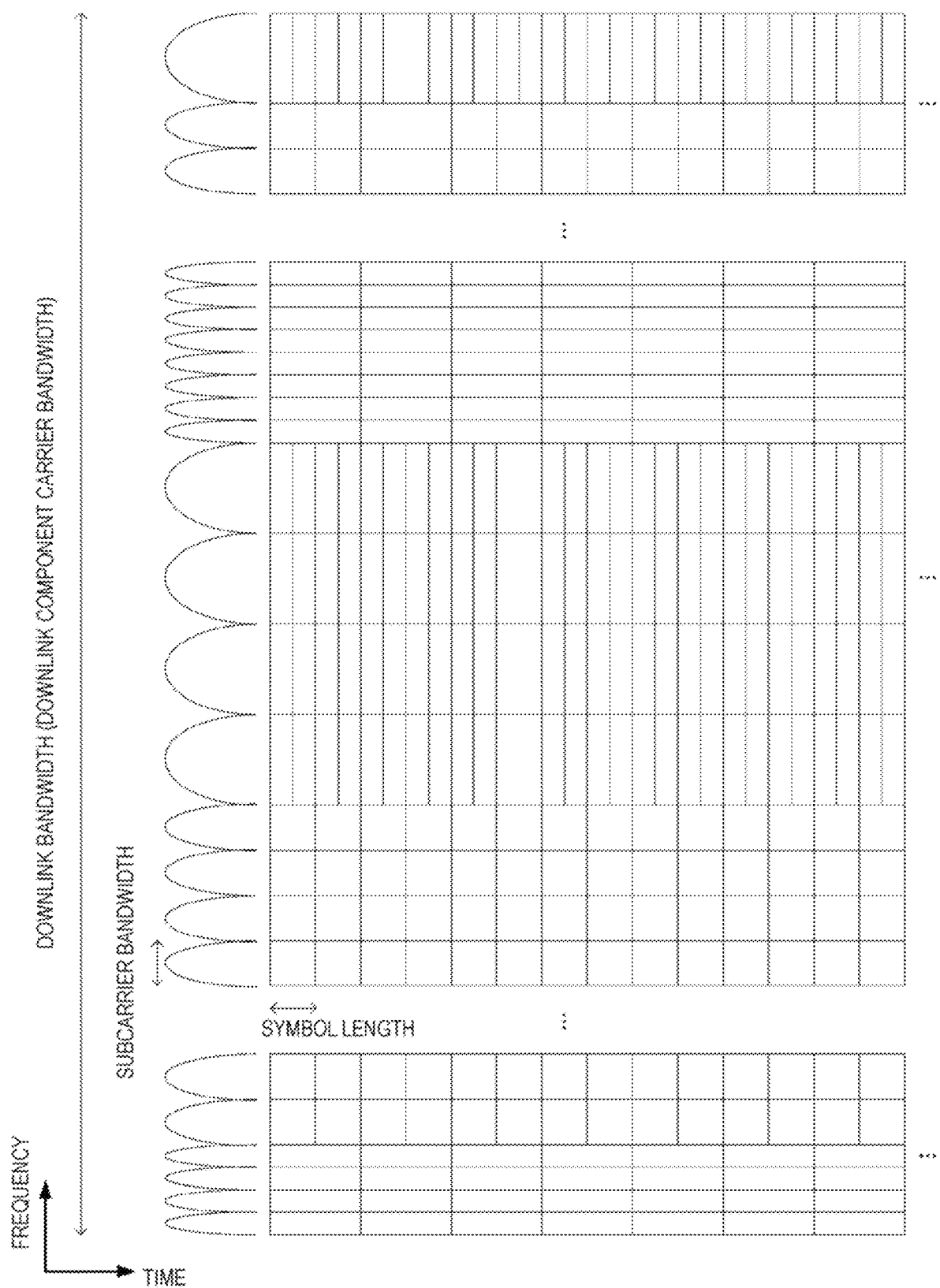
FIG. 4 is a diagram illustrating an example of a configuration of a slot according to the present embodiment.
Figure 5:
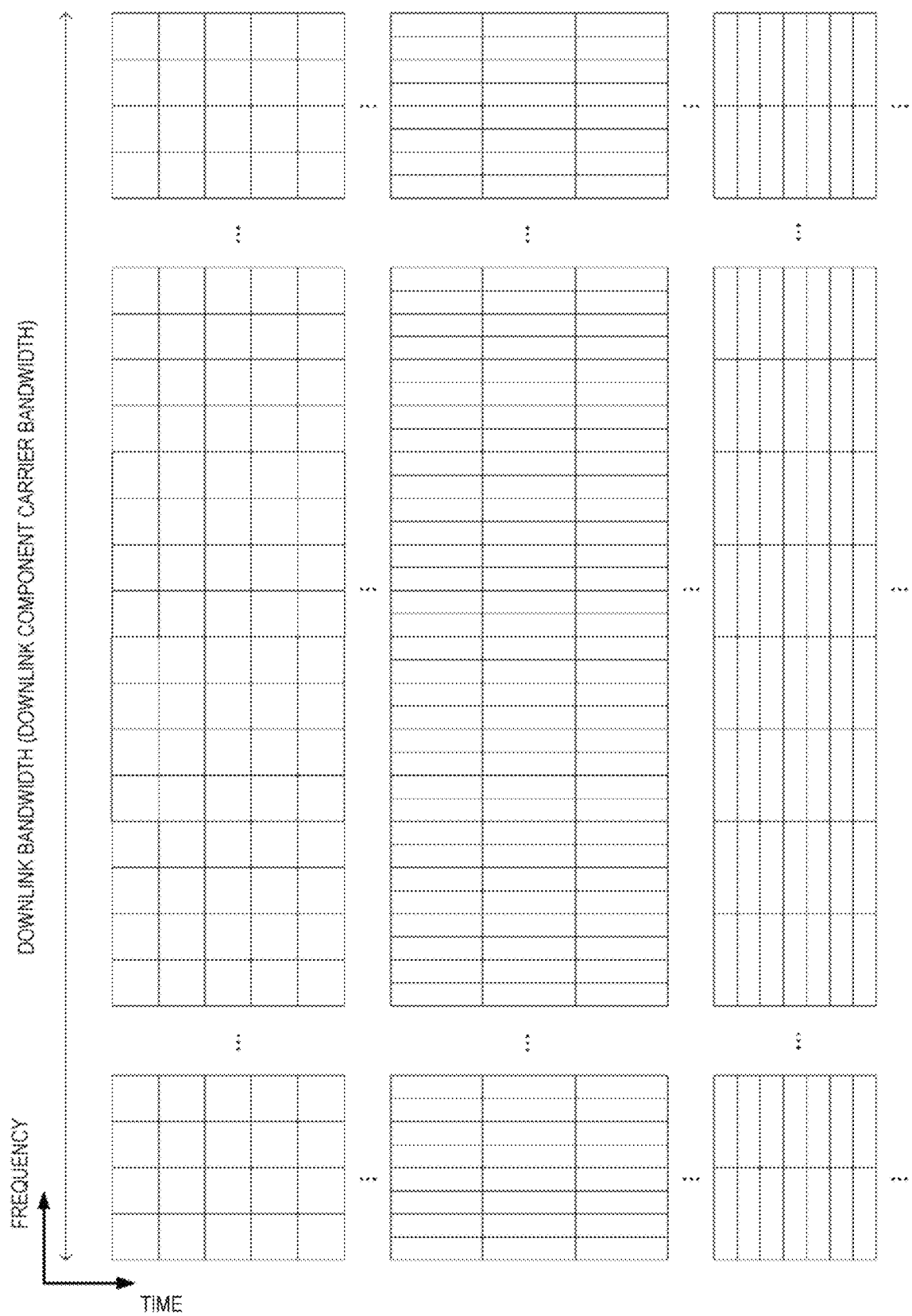
FIG. 5 is a diagram illustrating an example of the configuration of the slot according to the present embodiment.

FIG. 4 and FIG. 5 are diagrams illustrating configurations of a slot according to the present embodiment. In the present embodiment, a normal Cyclic Prefix (CP) may be applied to symbols. The physical signal or the physical channel transmitted in each of the slots is expressed by a resource grid. In FIG. 4 and FIG. 5, the horizontal axis represents a time axis, and the vertical axis represents a frequency axis. In the downlink, the resource grid is defined by multiple subcarriers and multiple symbols. In the uplink, the resource grid is defined by multiple subcarriers and multiple symbols. The symbols in the downlink may be OFDM symbols, filtered OFDM symbols, or DFT-S-OFDM symbols. The symbols in the uplink may be OFDM symbols, filtered OFDM symbols, SC-FDMA symbols, or DFT-S-OFDM symbols. The number of subcarriers constituting one slot depends on a cell bandwidth. Each element within the resource grid is referred to as a resource element. The resource element is identified by using a subcarrier number and a symbol number. It is apparent that the symbol length increases in a case of configuring a smaller subcarrier spacing and that the symbol length decreases in a case of configuring a larger subcarrier spacing. Configuring a smaller subcarrier spacing is the same as configuring a narrower subcarrier bandwidth, and configuring a larger subcarrier spacing is the same as configuring a wider subcarrier bandwidth.

A difference between FIG. 4 and FIG. 5 will be described. In FIG. 4, the subcarrier bandwidth (subcarrier spacing) is variable in the frequency domain but is not variable in the time domain. In other words, multiple subcarrier spacings coexist for a certain symbol in FIG. 4. In FIG. 5, the subcarrier bandwidths (subcarrier spacings) are not variable in the frequency domain but are variable in the time domain. In other words, multiple subcarrier spacings do not coexist for a certain symbol in FIG. 5. Although not illustrated, the subcarrier spacing may be semi-statistically variable or dynamically variable in the time domain in FIG. 4. Although not illustrated, the subcarrier spacing may be semi-statistically variable in the time domain in FIG. 4. In other words, the subcarrier spacing may not necessarily be dynamically variable in the time domain in FIG. 4. Although not illustrated, the subcarrier spacing may be semi-statistically variable or dynamically variable in the frequency domain in FIG. 5. Although not illustrated, the subcarrier spacing may be semi-statistically variable in the frequency domain in FIG. 5. In other words, the subcarrier spacing may not necessarily be dynamically variable in the frequency domain in FIG. 5.

Figure 6:
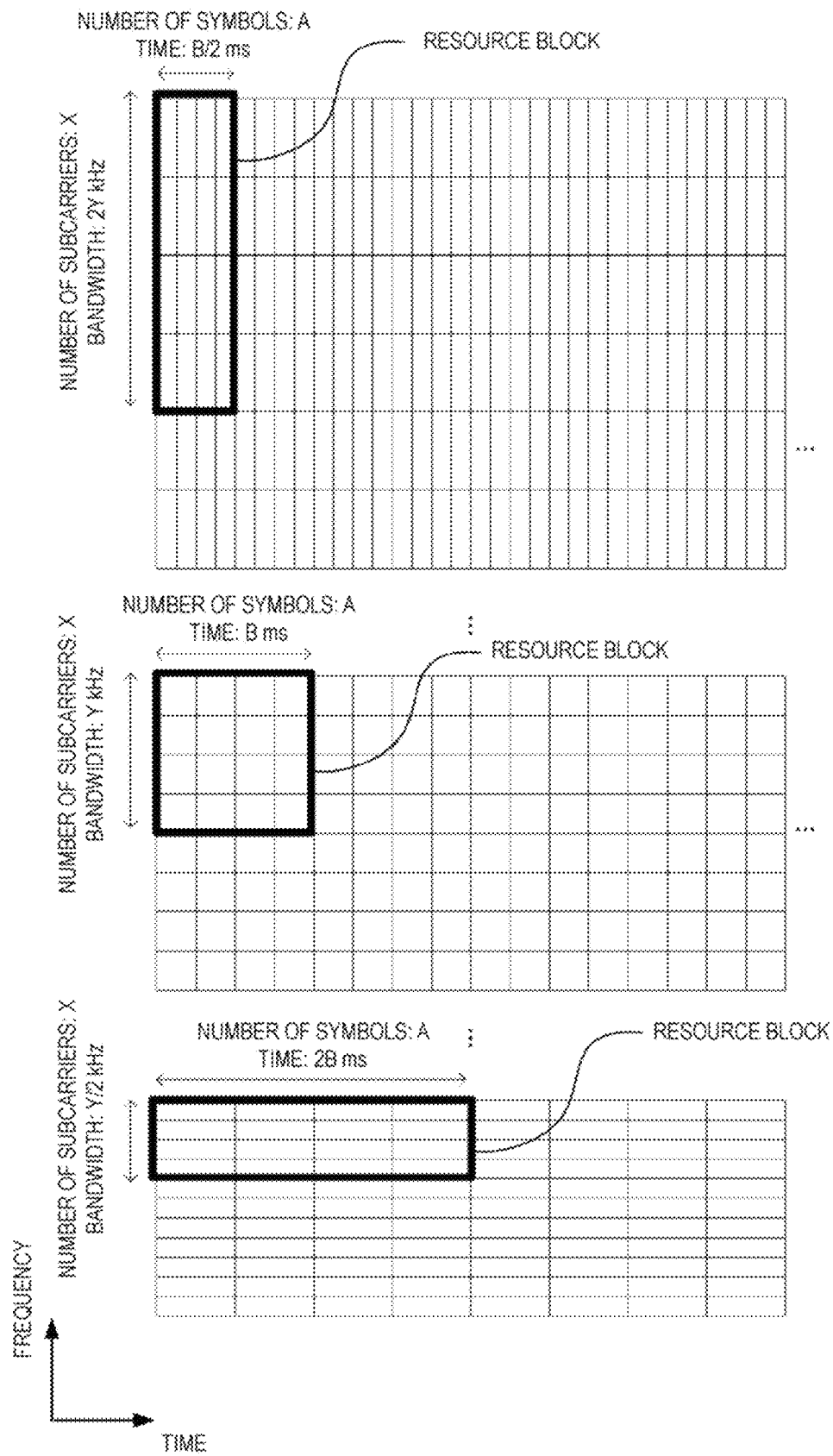
FIG. 6 is a diagram illustrating an example of resource blocks according to the present embodiment.

FIG. 6 is an example of resource blocks according to the present embodiment. Each region defined (specified) by a prescribed number of subcarriers and a prescribed number of symbols may be defined as a resource block. FIG. 6 is a diagram of a case that each region defined (specified) by four subcarriers in the frequency domain and four symbols in the time domain is defined as a resource block. As illustrated in FIG. 6, in a case that multiple subcarrier spacings are applicable, the frequency bandwidth and the time length defining (specifying) each resource block vary based on the applied subcarrier spacing. For example, a resource block is defined (specified) by a bandwidth of Y/2 kHz and a time of 2*B ms, a resource block is defined (specified) by a bandwidth of Y kHz and a time of B ms, and a resource block is defined (specified) by a bandwidth of 2*Y kHz and a time of B/2 ms. Although not illustrated, multiple subcarrier spacings and/or symbol lengths may be included in one resource block.

Although a description has been given of an example in which each resource block is defined as a region defined (specified) by the prescribed number of subcarriers and the prescribed number of symbols, each resource block may be defined only by a prescribed number of subcarriers or a prescribed number of symbols. In other words, each resource block may be defined using only the time domain or the frequency domain. In other words, each region defined (specified) by a prescribed number of subcarriers and/or a prescribed number of symbols may be defined as a resource block.

Figure 7:
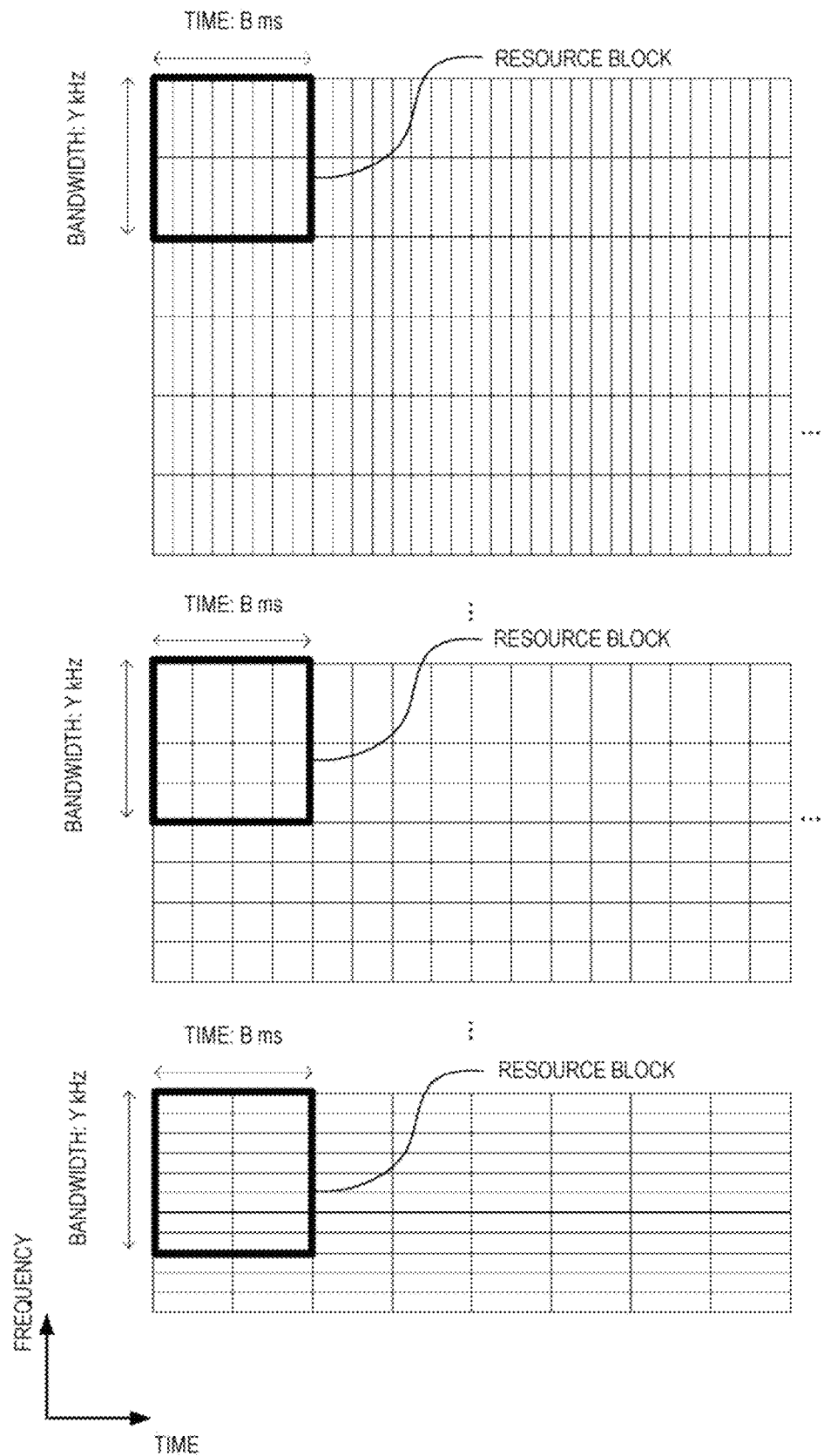
FIG. 7 is a diagram illustrating an example of resource blocks according to the present embodiment.

FIG. 7 is an example of resource blocks according to the present embodiment. Each region defined (specified) by a prescribed frequency bandwidth and a prescribed time (symbol time) may be defined as a resource block. FIG. 7 is a diagram of a case that each region defined (specified) by a bandwidth Y kHz and a time B ms is defined as a resource block. As illustrated in FIG. 7, in a case that multiple subcarrier spacings are applicable, the number of subcarriers and the number of symbols defining (specifying) one resource block varies. For example, a resource block is defined (specified) by eight subcarriers and two symbols, a resource block is defined (specified) by four subcarriers and four symbols, and a resource block is defined (specified) by two subcarriers and eight symbols. Although not illustrated, multiple subcarrier spacings and/or symbol lengths may be included in one resource block.

Although a description has been given of an example in which each region defined (specified) by the prescribed frequency bandwidth and the prescribed time is defined as a resource block, each resource block may be defined only by a prescribed frequency bandwidth or a prescribed time. In other words, each resource block may be defined using only the time domain or the frequency domain. In other words, each region defined (specified) by a prescribed frequency bandwidth and/or a prescribed time may be defined as a resource block.

A resource block may be used to express mapping of a certain physical channel (such as a downlink data channel (e.g., PDSCH) or an uplink data channel (e.g., PUSCH)) to resource elements. For the resource block, a virtual resource block and a physical resource block may be defined. A certain physical channel may first be mapped to the virtual resource block. Thereafter, the virtual resource block may be mapped to the physical resource block. The physical resource blocks may be numbered from zero in the frequency domain. The resource block may be referred to as a chunk.

Figure 8:
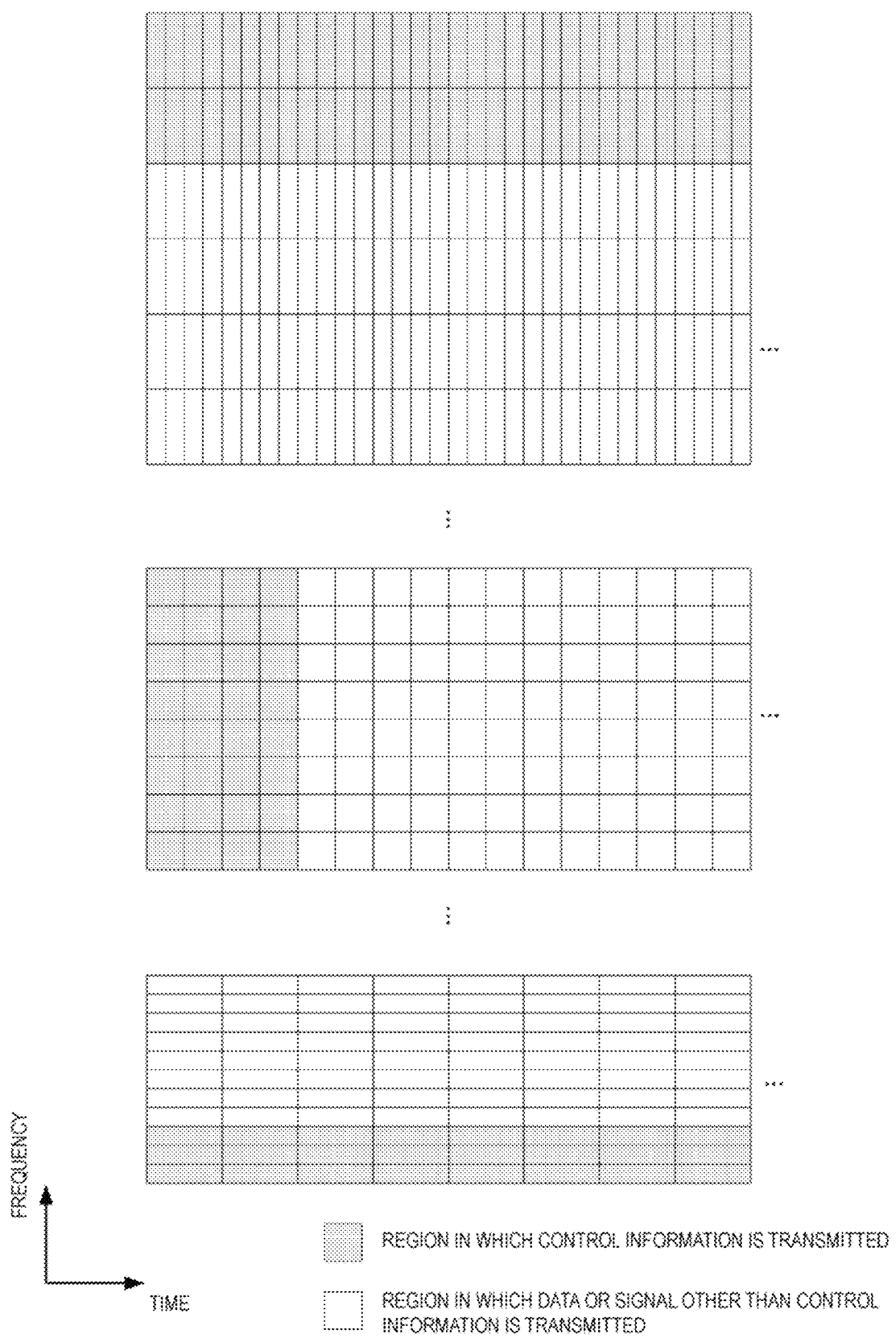
FIG. 8 is a diagram illustrating examples of a region in which control information is transmitted and a region in which data and/or signal other than the control information is transmitted, according to the present embodiment.

FIG. 8 is an example illustrating a region in which control information is transmitted and a region in which data and/or signal other than the control information is transmitted, according to the present embodiment. The region in which control information is transmitted may be referred to as a control channel, and the control channel may be a downlink control channel (e.g., PDSCH). The region in which data and/or signal other than control information is transmitted may include at least a region in which user data (channel, e.g., PDSCH, for example) is transmitted. The region in which control information is transmitted may be a prescribed subcarrier spacing. The region in which control information is transmitted and the region controlled by the control information transmitted in the region in which the control information is transmitted may have the same subcarrier spacing. The region in which control information is transmitted and the region controlled by the control information transmitted in the region in which the control information is transmitted may have different subcarrier spacings.

Figure 9:
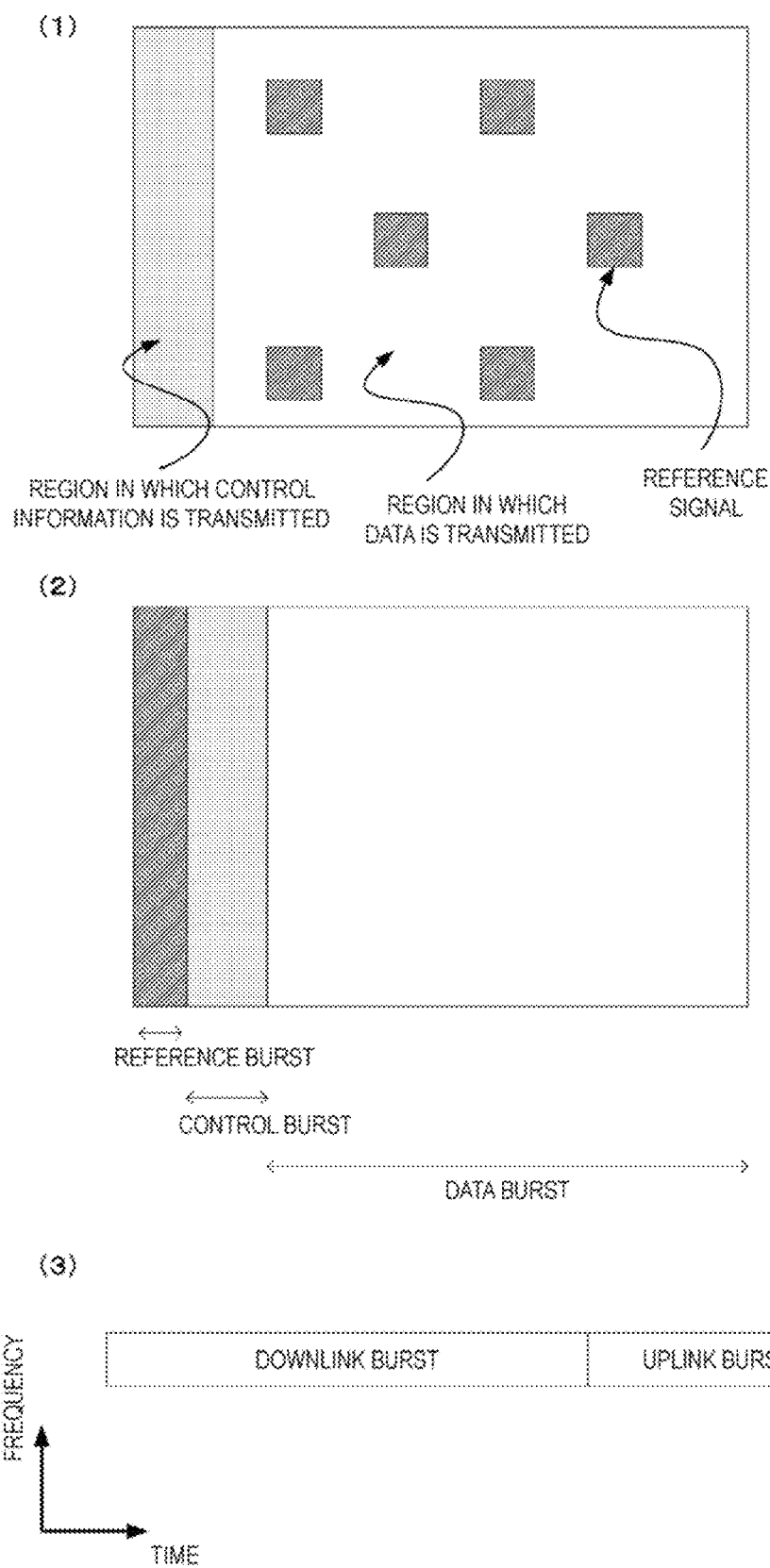
FIG. 9 is a diagram illustrating an example of a radio resource use method according to the present embodiment.

FIG. 9 is an example of a radio resource use method according to the present embodiment.

A radio resource use method illustrated in (1) of FIG. 9 will be described. In (1), a region in which control information is transmitted is at the beginning in the time domain, and subsequently reference signals (RSs) are transmitted in a distributed manner in the frequency domain and the time domain. The region in which neither the control signals nor the reference signals is transmitted may be used for data transmission. Although not illustrated, reference signals (RSs) may also be transmitted in the region for transmitting control information. A reference signal transmitted in the region for transmitting control information (reference signal for control information) and a reference signal transmitted in the region for transmitting data (reference signal for data) may be different from each other.

A radio resource use method illustrated in (2) of FIG. 9 will be described. In (2), a region for transmitting reference signals (reference burst) is at the beginning in the time domain and is followed by a region for transmitting control information (control burst) and a region for transmitting data (data burst). The region in which neither the control signal nor the reference signals is transmitted may be used for data transmission. The reference signals transmitted in the reference burst may be associated with signals transmitted in the control burst and/or data burst. Specifically, the reference signals transmitted in the reference burst may be used for demodulation of the signals transmitted in the control burst and/or data burst. The reference signals for the control information burst and the reference signals for the data burst may be different. Different subcarrier spacings may be applied to the respective bursts (reference burst, control burst, and data burst). For example, the subcarrier spacing to be applied to each of the bursts may be notified at the beginning (first symbol or first multiple symbols) of the burst. For example, notification may be made in each burst, regarding the subcarrier spacing to be applied to the next burst continuous to the burst in terms of time. For example, the subcarrier spacing of the burst (data burst) controlled by the control information transmitted by a control burst may be notified in the control burst. A gap may be present between the bursts, although not illustrated.

A radio resource use method illustrated in (3) of FIG. 9 will be described. In (3), a region for downlink transmission (downlink burst) is at the beginning in the time domain and is followed by a region for uplink transmission (uplink burst). In the downlink burst, some of or all control signals, data signals, and reference signals may be transmitted. In the uplink burst, some of or all a control signal, a data signal, and a reference signal may be transmitted. Different subcarrier spacings may be applied to the respective bursts (downlink burst and uplink burst). For example, the subcarrier spacing to be applied to each of the bursts may be notified at the beginning (first symbol or first multiple symbols) of the burst. A gap may be present between the bursts, although not illustrated. For example, notification may be made in a downlink burst, regarding the subcarrier spacing to be applied to the uplink burst contiguous to the downlink burst in terms of time.

Figure 10:
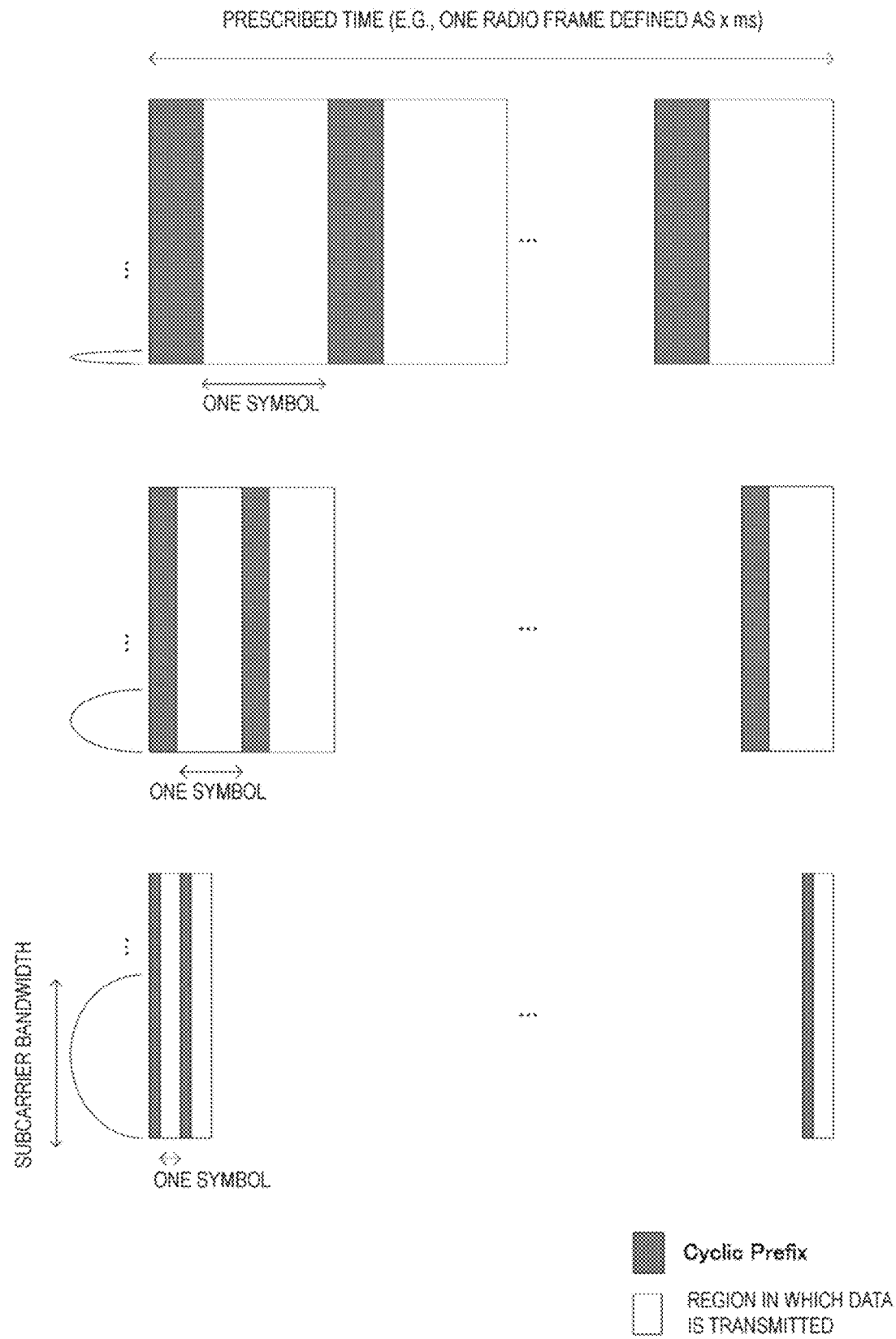
FIG. 10 is a diagram illustrating an example of addition of CP according to the present embodiment.

FIG. 10 is an example of addition of CP according to the present embodiment. It is apparent that the symbol length increases in a case of configuring a smaller subcarrier spacing and that the symbol length decreases in a case of configuring a larger subcarrier spacing. Configuring a smaller subcarrier is the same as configuring a narrower subcarrier bandwidth, and configuring a larger subcarrier spacing is the same as configuring a wider subcarrier bandwidth. In other words, FIG. 10 illustrates that CPs having different lengths are added to symbols having different symbol lengths. In other words, the symbol length and the length of the CP may correspond to each other. Specifically, a first CP is added to a symbol having a first symbol length, a second CP is added to a symbol having a second symbol length, . . . , and an x-th CP is added to an x-th symbol length. The CP (CP length) to be added may be determined based on the symbol length of the symbol to which the CP is added, that is, the CP (CP length) to be added may be implicitly determined based on the symbol length of the symbol to which the CP is to be added. The CP (CP length) to be added may be explicitly notified by the base station apparatus (may be notified (transmitted) by using L1 or higher layer signaling). Having different symbol lengths is the same as having different subcarrier spacings. In other words, a symbol length can be rephrased as a subcarrier spacing.

Figure 11:
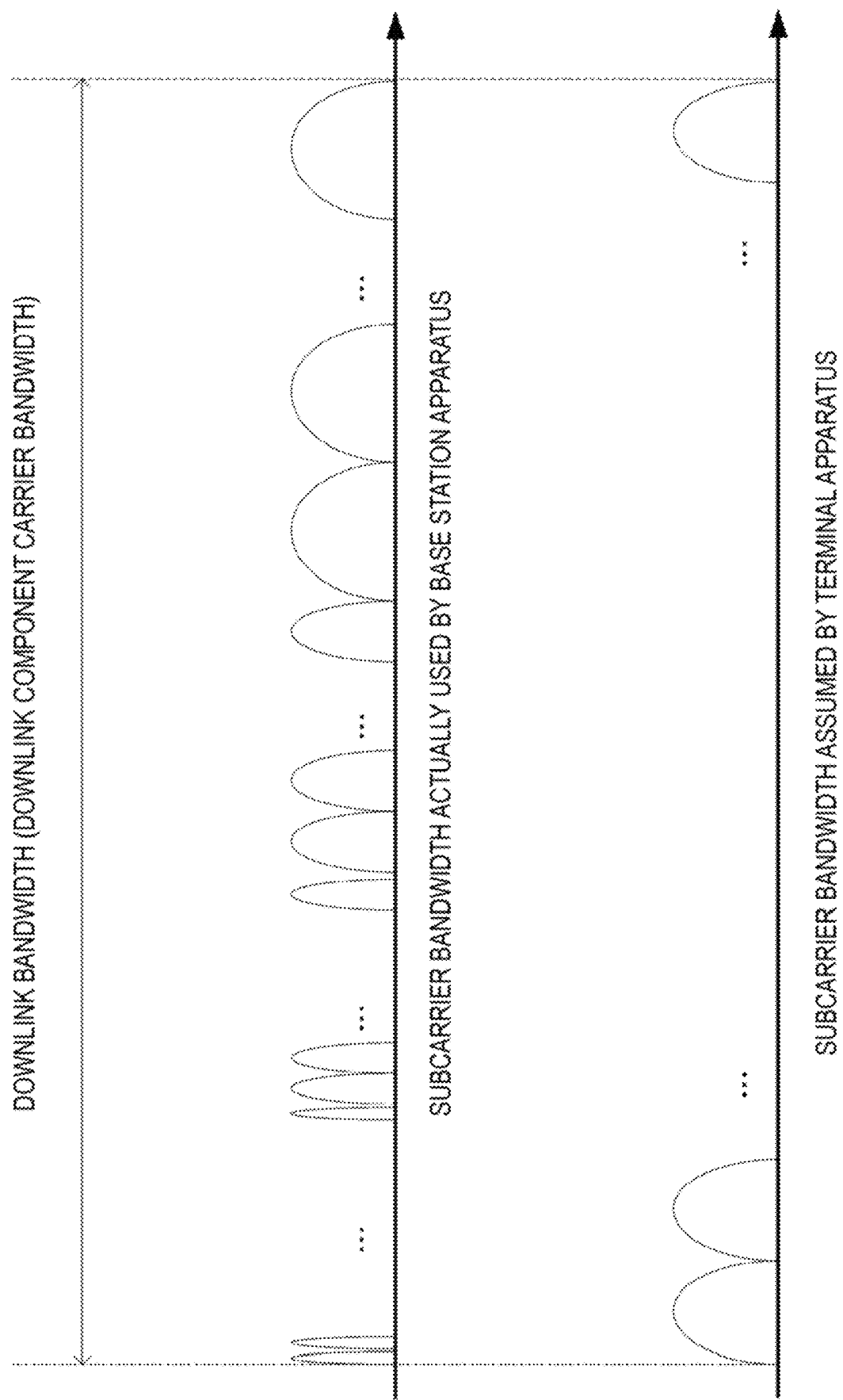
FIG. 11 is a diagram illustrating an example of CSI measurement and/or RRM measurement according to the present embodiment.

FIG. 11 is an example of CSI measurement and/or RRM measurement according to the present embodiment. The Channel State Information (CSI) may be measured based on a reference signal. For example, the CSI may be measured based on a channel state information reference signal (CSI-RS) or a Cell-specific RS (CRS). The CSI includes a Channel Quality indicator (CQI), a Precoding Matrix Indicator (PMI), a Precoding Type Indicator (PTI), and a Rank Indication (RI), which may be used respectively for specifying (representing) a preferable modulation scheme and coding rate, a preferable precoding matrix, a preferable PMI type, and a preferable rank. Note that each of the Indicators may be denoted as Indication. Moreover, the CQI and the PMI may be classified into wideband CQI and PMI assuming channel transmission using all the resource blocks in a single cell, and subband CQI and PMI assuming channel transmission using some contiguous resource blocks (subbands) in a single cell. Moreover, PMI may include a type of PMI, which represents a single preferable precoding matrix using two types of PMIs, which are a first PMI and a second PMI, in addition to a normal type of PMI, which represents a single preferable precoding matrix using a single PMI. Radio Resource Management measurement (RRM measurement) may be measurement associated with RSRP measurement, RSRQ measurement, and RSSI measurement. The RRM measurement may be performed based on a reference signal, such as a CRS or a CSI-RS.

Even in a case, as in FIG. 11, that a base station apparatus uses multiple different subcarrier spacings, a terminal apparatus may perform CSI measurement and/or RRM measurement by assuming the downlink bandwidth of channel transmission with a prescribed subcarrier spacing. Note that "perform CSI measurement and/or RRM measurement by assuming the downlink bandwidth with a prescribed subcarrier spacing" means performing CSI measurement and/or RRM measurement by assuming that the prescribed subcarrier spacing is applied to the entire downlink bandwidth. Here, the prescribed subcarrier spacing may be defined in advance, may be explicitly notified by the base station apparatus (may be notified (transmitted) by using L1 or higher layer signaling), or may be determined by the terminal apparatus (implicitly determined).

Figure 12:
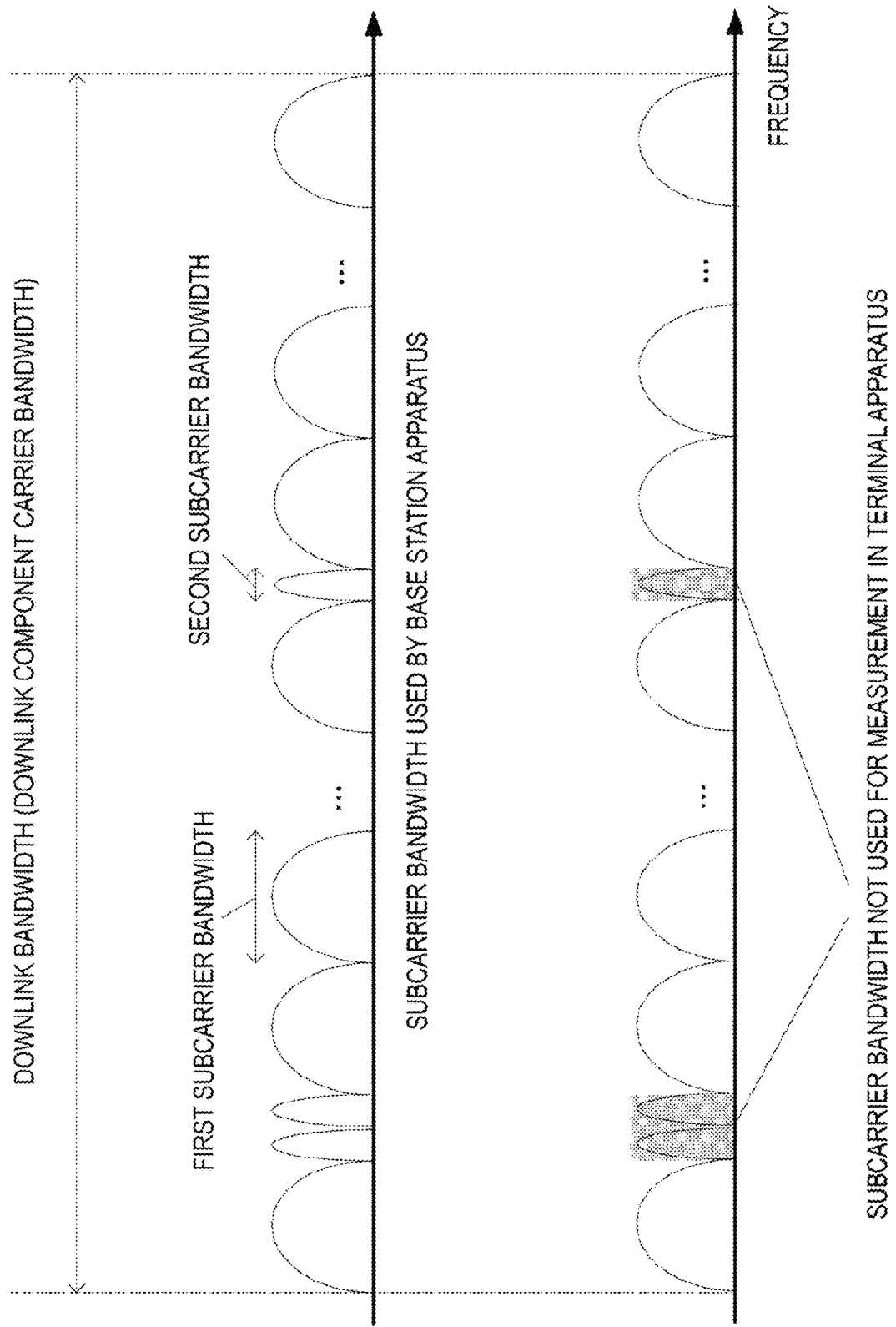
FIG. 12 is a diagram illustrating an example of CSI measurement and/or RRM measurement according to the present embodiment.

FIG. 12 is an example of CSI measurement anchor RRM measurement according to the present embodiment. In a case that a base station apparatus uses multiple different subcarrier spacings, the terminal apparatus may perform CSI measurement and/or RRM measurement by using a frequency band to which a prescribed subcarrier spacing is applied. For example, in a case as in FIG. 12, that first subcarrier spacing (subcarrier bandwidth) and a second subcarrier spacing are used for downlink transmission, the terminal apparatus may perform CSI measurement and/or RRM measurement by using a frequency band to which the first subcarrier spacing is applied. The subcarrier spacing and/or the frequency position to be used for CSI measurement and/or RRM measurement may be defined in advance, may be explicitly notified by the base station apparatus (may be notified (transmitted) by using L1 or higher layer signaling), or may be determined by the terminal apparatus (implicitly determined). The subcarrier spacing and/or the frequency position not to be used for CSI measurement and/or RRM measurement may be defined in advance, may be explicitly notified by the base station apparatus (may be notified (transmitted) by using L1 or higher layer signaling), or may be determined by the terminal apparatus (implicitly determined). The subcarrier spacing to be used for CSI measurement and/or RRM measurement may be determined based on some of or all Element (1) to Element (4) to be described later. The subcarrier spacing for a measurement object relating to the RRM measurement may be determined based on some of or all Element (1) to Element (4) to be described later. The measurement object relating to the RRM measurement may include information associated with the subcarrier spacing. The measurement object relating to the RRM measurement may include information associated with a CP (CP length). The measurement object relating to the RRM measurement may include information associated with a frequency position (such as information indicating a band, information indicating an operating band, or information indicating a carrier frequency). The measurement object relating to the RRM measurement may include information associated with cell identification (such as a cell ID or the ID of a measurement target cell).

FIG. 13 is an example of scheduling (self scheduling) according to the present embodiment. "Self scheduling" in the present embodiment means that, for example, in FIG. 2, the region for transmitting control information is present in the x-th region (x is any number) and the region controlled by the control information is present in the x-th region. In other words, in FIG. 2, the region for transmitting control information and the region controlled by the control information are present in the same x-th region.

Scheduling illustrated in (1) of FIG. 13 (self scheduling) will be described. (1) is an example that the region in which control information is transmitted and a region in which data and/or signal other than the control information is transmitted have the same subcarrier spacing. In other words, the region in which control information is transmitted (e.g., a region 1 in FIG. 13) and the region controlled by the control information (e.g., a region 2 in FIG. 13) have the same subcarrier spacing. In (1), the region in which control information is transmitted and the region controlled by the control information may be prohibited from having different subcarrier spacings.

Scheduling illustrated in (2) of FIG. 13 (self scheduling) will be described. (2) is an example that the region in which control information is transmitted and a region in which data and/or signal other than the control information is transmitted have different subcarrier spacings. In other words, the region in which control information is transmitted (e.g., a region 3 in FIG. 13) and the region controlled by the control information (e.g., a region 4 in FIG. 13) have different subcarrier spacings.

FIG. 14 is an example of scheduling (cross scheduling) according to the present embodiment. "Cross scheduling" in the present embodiment means that, for example, in FIG. 2, the region in which control information is transmitted is present in the x-th region (x is any number) and the region controlled by the control information is present in the x-th region (y is any number different from x). In other words, in FIG. 2, the region in which control information is transmitted and the region controlled by the control information are present in different regions.

Scheduling illustrated in (1) of FIG. 14 (cross scheduling) will be described. (1) is an example that the region in which control information is transmitted and a region in which data and/or signal other than the control information is transmitted have different subcarrier spacings. In other words, the region in which control information is transmitted (e.g., a region 1 in FIG. 14) and the region controlled by the control information (e.g., a region 2 in FIG. 14) may have different subcarrier spacings.

Scheduling illustrated in (2) of FIG. 14 (cross scheduling) will be described. (2) is an example that the region in which control information is transmitted and a region in which data and/or signal other than the control information is transmitted have the same subcarrier spacing. In other words, the region in which control information is transmitted (e.g., a region 3 in FIG. 14) and the region controlled by the control information (e.g., a region 4 in FIG. 14) have the same subcarrier spacing. In (2), the region in which control information is transmitted and the region controlled by the control information may be prohibited from having different subcarrier spacings. For example, the region 3 in FIG. 14 may be prohibited from controlling a region 5 in FIG. 14.

Figure 15:
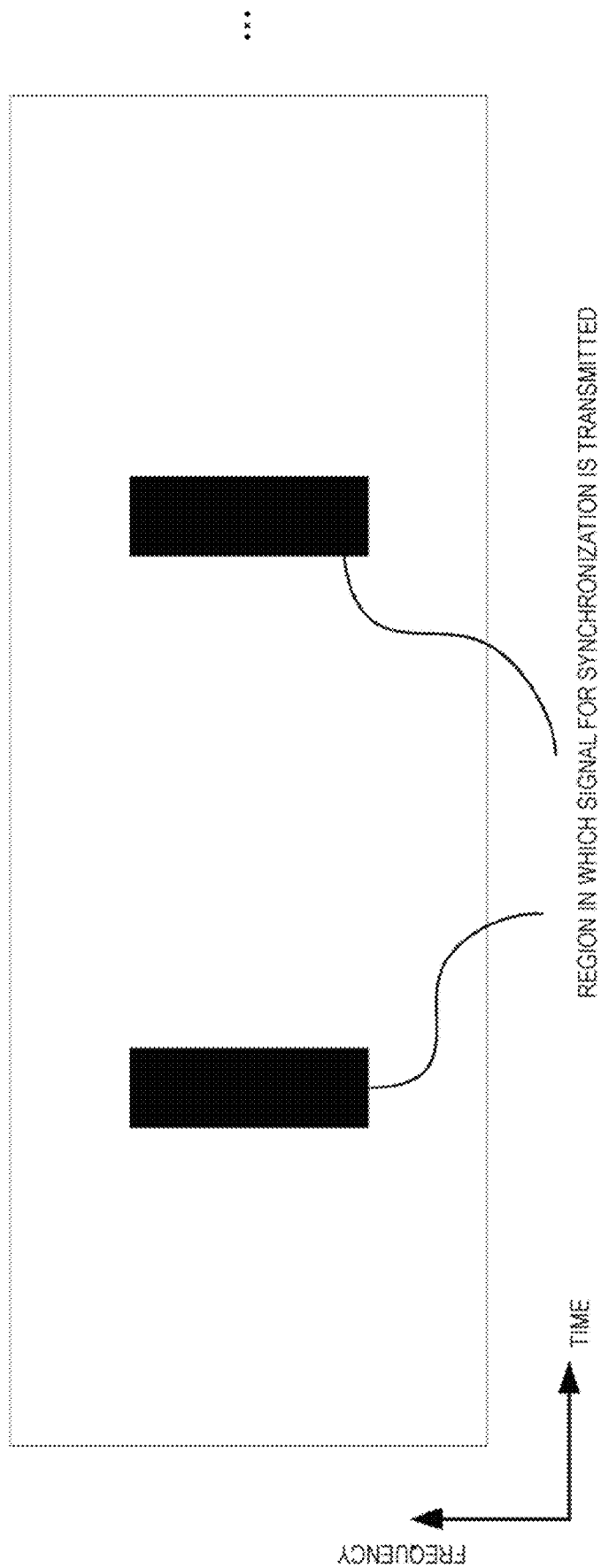
FIG. 15 is a diagram illustrating an example of a synchronization signal transmission method according to the present embodiment.

FIG. 15 is an example of a Synchronization signal transmission method according to the present embodiment. The Synchronization signal (SS) is used for a terminal apparatus to be synchronized in terms of frequency and time domains in the downlink. In the TDD scheme, the Synchronization signal may be mapped to subframes 0, 1, 5, and 6 within a radio frame. In the FDD scheme, the Synchronization signal may be mapped to subframes 0 and 5 within a radio frame. The Synchronization signal may include a Primary synchronization signal (PSS) and the Secondary synchronization signal (PSS). Even in a case that the Synchronization signal is transmitted in the frequency band to which multiple subcarrier spacings are applicable, a prescribed subcarrier spacing may always be applied to transmission of the Synchronization signal. The prescribed subcarrier spacing applied to the transmission of the Synchronization signal may be determined based on some of or all Element (1) to Element (4) to be described later.

FIG. 16 is an example of a multicast data transmission method according to the present embodiment. Multicast data transmission may be transmission associated with Multimedia Broadcast multicast service Single Frequency Network (MBSFN). For example, multicast data transmission may be transmission of MBSFN subframes. Terminal apparatuses may be divided into multiple MBSFN groups. Note that division to the MBSFN groups may be based on services in which the terminal apparatuses are interested. Division to the MBSFN groups may be based on requirements of the services in which the terminal apparatuses are interested. The subcarrier spacing to be applied may be different for each MBSFN group. For example, the first subcarrier spacing may be used for MBSFN group 1, the second subcarrier spacing may be used for MBSFN group 2, . . . , and the x-th subcarrier spacing may be used for MBSFN group x. Note that multiple MBSFN groups may be frequency-multiplexed, time-multiplexed, or code-multiplexed. The subcarrier spacings for the MBSFN groups may be determined based on some of or all Element (1) to Element (4) to be described later. Each terminal apparatus may select an MBSFN group and a cell corresponding to the MBSFN group, based on the subcarrier spacings for the MBSFN groups.

Figure 22:
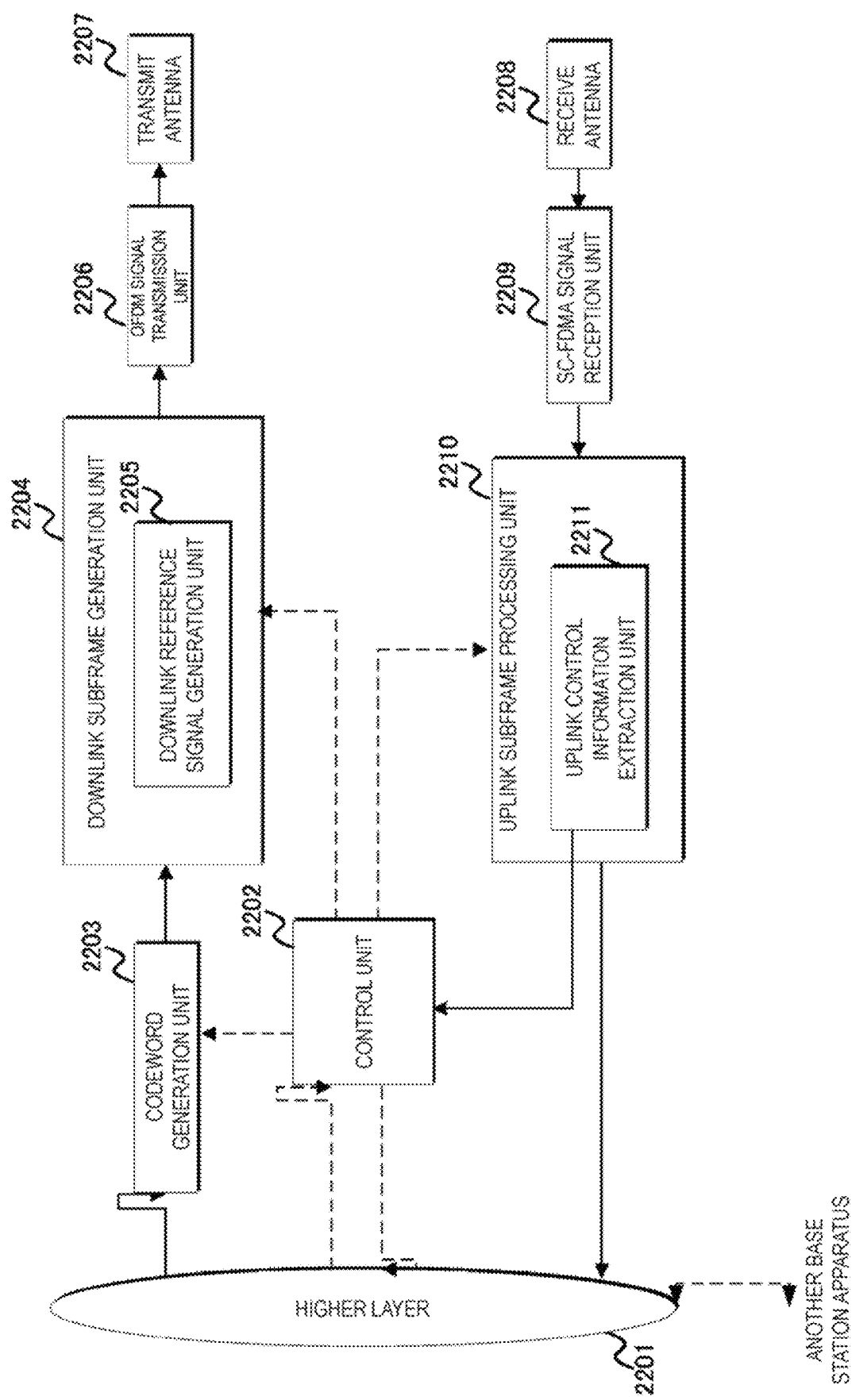
FIG. 22 is a diagram illustrating an example of a block configuration of a base station apparatus according to the present embodiment.

FIG. 22 is a schematic diagram illustrating an example of a block configuration of a base station apparatus according to the present embodiment. The base station apparatus includes a higher layer (higher-layer control information notification unit, higher layer processing unit) 2201, a control unit (base station control unit) 2202, a codeword generation unit 2203, a downlink subframe generation unit 2204, an OFDM signal transmission unit (downlink transmission unit) 2206, a transmit antenna (base station transmit antenna) 2207, a receive antenna (base station receive antenna) 2208, an SC-FDMA signal reception unit (CSI reception unit) 2209, and an uplink subframe processing unit 2210. The downlink subframe generation unit 2204 includes a downlink reference signal generation unit 2205. Moreover, the uplink subframe processing unit 2210 includes an uplink control information extraction unit (CSI acquisition unit) 2211. Note that the transmit antenna 2207 may be referred to as a base station transmit antenna 2207, and the receive antenna 2208 may be referred to as a base station receive antenna 2208.

Figure 23:
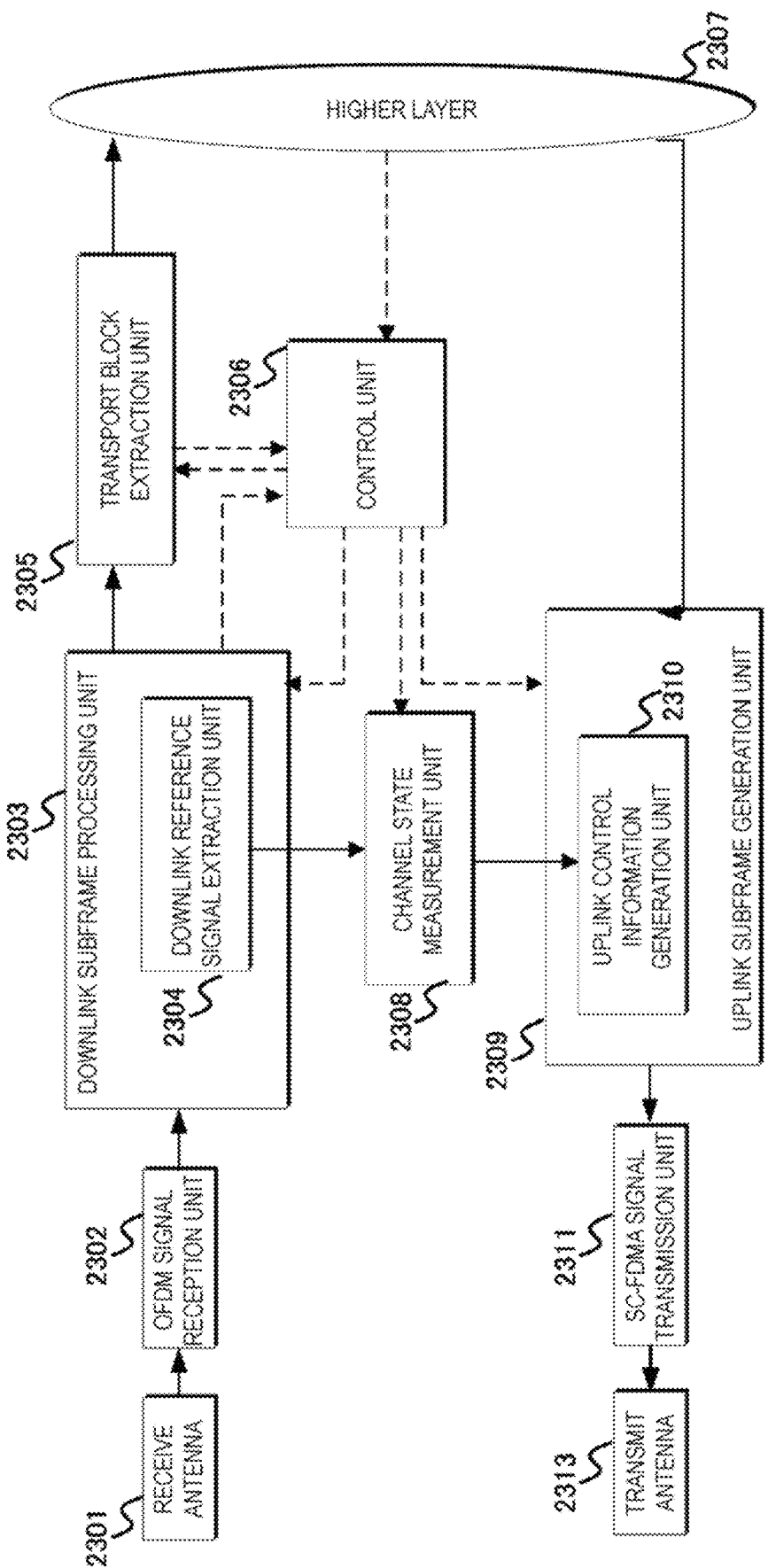
FIG. 23 is a diagram illustrating an example of a block configuration of a terminal apparatus according to the present embodiment.

FIG. 23 is a schematic diagram illustrating an example of a block configuration of a terminal apparatus according to the present embodiment. The terminal apparatus includes a receive antenna (terminal receive antenna) 2301, an OFDM signal reception unit (downlink reception unit) 2302, a downlink subframe processing unit 2303, a transport block extraction unit (data extraction unit) 2305, a control unit (terminal control unit) 2306, a higher layer (higher-layer control information acquisition unit, higher layer processing unit) 2307, a channel state measurement unit (CSI generation unit) 2308, an uplink subframe generation unit 2309, SC-TDMA signal transmission units (UCI transmission units) 2311 and 2312, and transmit antennas (terminal transmit antennas) 2313 and 2314. The downlink subframe processing unit 2303 includes a downlink reference signal extraction unit 2304. Moreover, the uplink subframe generation unit 2309 includes an uplink control information generation unit (UCI generation unit) 2310. The transmit antenna 2313 may be referred to as a terminal transmit antenna 2313, the transmit antenna 2314 may be referred to as a terminal transmit antenna 2314, and the receive antenna 2301 may be referred to as a terminal receive antenna 2301.

First, a flow of downlink data transmission and/or reception will be described with reference to FIG. 22 and FIG. 23. In the base station apparatus, the control unit 2202 holds a Modulation and Coding Scheme (MCS) indicating a modulation scheme, a coding rate, and the like in the downlink, a downlink resource allocation indicating RBs to be used for data transmission, and information to be used for HARQ control (a redundancy version, an HARQ process number, and a new data indicator) and controls the codeword generation unit 2203 and the downlink subframe generation unit 2204, based on these elements. Downlink data (also referred to as a downlink transport block) transmitted from the higher layer 2201 is processed through error correction coding, rate matching, and the like in the codeword generation unit 2203 under the control of the control unit 2202 and then, a codeword is generated. Two codewords at maximum are transmitted at the same time in a single subframe of a single cell. The control unit 2202 indicates the downlink subframe generation unit 2204 to generate a downlink subframe. First, a codeword generated in the codeword generation unit 2203 is converted into a modulation symbol sequence through a modulation process, such as Phase Shift Keying (PSK) modulation or Quadrature Amplitude Modulation (QAM). Moreover, a modulation symbol sequence is mapped onto REs of some RBs, and a downlink subframe for each antenna port is generated through a preceding process. In this operation, the transmission data sequence transmitted from the higher layer 2201 includes higher-layer control information, which is control information about the higher layer (e.g., dedicated (individual) Radio Resource Control (RRC) signaling). Furthermore, the downlink reference signal generation unit 2205 generates a downlink reference signal. The downlink subframe generation unit 220.4 maps the downlink reference signal to the REs in the downlink subframes in accordance with an indication from the control unit 2202. The OFDM signal transmission unit 2206 modulates the downlink subframe generated by the downlink subframe generation unit 2204 to an OFDM signal, and then transmits the OFDM signal through the transmit antenna 2207. Although a configuration including one OFDM signal transmission unit 2206 and one transmit antenna 2207 is provided as an example here, a configuration including multiple OFDM signal transmission units 2206 and multiple transmit antennas 2207 may be employed in a case that downlink subframes are transmitted on multiple antenna ports. Furthermore, the downlink subframe generation unit 2204 may also have a capability of generating physical-layer downlink control channels, such as a PDCCH and an EPDCCH, to map the channels to REs in the downlink subframes. Multiple base station apparatuses (base station apparatus −1 and base station apparatus −2) transmit separate downlink subframes. The receive antenna 2208 receives an SC-FDMA signal and a CSI and conveys the received signals to the SC-FDMA signal reception unit 2209. Moreover, the SC-FDMA signal reception unit 2209 conveys data to the uplink subframe processing unit 2210. Moreover, the uplink subframe processing unit 2210 extracts uplink control information in the uplink control information extraction unit 2211.

In the terminal apparatus, an OFDM signal is received by the OFDM signal reception unit 2302 through the receive antenna 2301, and an OFDM demodulation process is performed on the signal. The downlink subframe processing unit 2303 first detects physical-layer downlink control channels, such as a PDCCH and an EPDCCH. More specifically, the downlink subframe processing unit 2303 decodes the signal by assuming that a PDCCH and an EPDCCH have been transmitted in the regions to which the PDCCH and the EPDCCH can be assigned, and checks Cyclic Redundancy Check (CRC) bits added in advance (blind decoding). In other words, the downlink subframe processing unit 2303 monitors a PDCCH and an EPDCCH. In a case that the CRC bits match an ID (a single terminal-specific identifier assigned to a single terminal, such as a Cell-Radio Network Temporary Identifier (C-RNTI) or a Semi Persistent Scheduling-C-RNTI (SPS-C-RNTI), or a Temporary C-RNTI) assigned by the base station apparatus beforehand, the downlink subframe processing unit 2303 recognizes that a PDCCH or an EPDCCH has been detected and extracts a PDSCH by using control information included in the detected PDCCH or EPDCCH. The control unit 2202 holds an MCS indicating a modulation scheme, a coding rate, and the like in the downlink based on the control information, a downlink resource allocation indicating RBs to be used for downlink data transmission, and information to be used for HARQ control, and controls the downlink subframe processing unit 2303, the transport block extraction unit 2305, and the like, in accordance with these elements. More specifically, the control unit 2202 performs control so as to carry out an RE demapping process, a demodulation process, and the like corresponding to the RE mapping process and the modulation process in the downlink subframe generation unit 2204. The PDSCH extracted from the received downlink subframe is transmitted to the transport block extraction unit 2305. Furthermore, the downlink reference signal extraction unit 2304 in the downlink subframe processing unit 2303 extracts the downlink reference signal from the downlink subframe. In the transport block extraction unit 2305, a rate matching process, a rate matching process corresponding to error correction coding, error correction decoding, and the like in the codeword generation unit 2203 are performed, and a transport block is extracted and transmitted to the higher layer 607. The transport block includes higher-layer control information, and the higher layer 2201 notifies the control unit 2202 of a necessary physical-layer parameter, based on the higher-layer control information. Multiple base station apparatuses (base station apparatus −1 and base station apparatus −2) transmit separate downlink subframes, and the terminal apparatus receives the downlink subframes. Hence, the above-described processes may be performed for the downlink subframe of each of the multiple base station apparatuses. In this situation, the terminal apparatus may recognize or may not necessarily recognize that multiple downlink subframes have been transmitted from the multiple base station apparatuses. In a case that the terminal apparatus does not recognize as above, the terminal apparatus may simply recognize that multiple downlink subframes have been transmitted in multiple cells. Moreover, the transport block extraction unit 2305 determines whether the transport block has been detected correctly, and transmits a determination result to the control unit 2202.

Next, a flow of uplink signal transmission and/or reception will be described. In the terminal apparatus, under the indication of the control unit 2306, a downlink reference signal extracted by the downlink reference signal extraction unit 2304 is transmitted to the channel state measurement unit 2308, and, in the channel state measurement unit 2308, the channel state and/or interference is measured, and further CSI is calculated based on the measured channel state and/or interference. The control unit 2306 indicates the uplink control information generation unit 2310 to generate an HARQ-ACK (DTX (not transmitted yet), ACK (detection success), or NACK (detection failure)) and to map the HARQ-ACK to a downlink subframe, based on a determination result of whether the transport block is correctly detected. The terminal apparatus performs these processes on the downlink subframe of each of multiple cells. In the uplink control information generation unit 2310, a PUCCH including the calculated CSI and/or HARQ-ACK is generated. In the uplink subframe generation unit 2309, the PUSCH including the uplink data transmitted from the higher layer 2307 and the PUCCH generated by the uplink control information generation unit 2310 are mapped to RBs in an uplink subframe, and an uplink subframe is generated. The uplink subframe is subjected to the SC-FDMA modulation in the SC-FDMA signal transmission unit 2311 to generate an SC-FDMA signal, and the SC-FDMA signal transmission unit 2311 transmits the SC-FDMA signal via the transmit antenna 2313.

For example, in the present embodiment, some of or all the following signals may be transmitted. Some of or all the following signals may be transmitted in the downlink. Some of or all the following signals may be transmitted in the uplink. Some of or all the following signals may be transmitted in both the downlink and the uplink.

Signal associated with synchronization
    Signal associated with initial access
    Signal associated with control
    Signal associated with data
    Reference signal Some of or all the above signals may be transmitted from the base station apparatus for one terminal apparatus and/or another base station apparatus. Specifically, some of or all the above signals may be transmitted from the base station apparatus for one terminal apparatus and/or another base station apparatus at a certain time. "At a certain time" can be rephrased as in a certain radio frame, in a certain subframe, in a certain slot, in a certain symbol, or the like.

Some of or all the above signals may be transmitted from the base station apparatus for multiple terminal apparatuses and/or multiple other base station apparatuses. Specifically, some of or all the above signals may be transmitted from the base station apparatus for multiple terminal apparatuses and/or other base station apparatuses at a certain time. "At a certain time" can be rephrased as in a certain radio frame, in a certain subframe, in a certain slot, in a certain symbol, or the like. "Transmitted for multiple terminal apparatuses and/or other base station apparatuses" may mean that some of or all the above signals are time-multiplexed (time division multiplexed), frequency-multiplexed (frequency division multiplexed), spatial multiplexed, or code-multiplexed, for multiple terminal apparatuses and/or other base station apparatuses. "At a certain time" can be rephrased as in a certain radio frame, in a certain subframe, in a certain slot, in a certain symbol, or the like.

Reference signals for some or all the above signals may be transmitted together with some or all the above signals. Reference signals may be associated with some or all the above signals. Reference signals may correspond with some or all the above signals. Reference signals may be different (independent) for some or all the above signals. For example, a first reference signal may be transmitted for a first signal, a second reference signal may be transmitted for a second signal, . . . , and an x-th reference signal may be transmitted for an x-th signal. A reference signal may be common to multiple signals. For example, the first reference signal may be transmitted for the first signal, the first reference signal may be transmitted for the second signal, and a third reference signal may be transmitted for a third signal. A reference signal may be transmitted at the same time and/or frequency with that of the associated signal. For example, the reference signal may be transmitted in the same radio frame as that of the associated signal, in the same subframe as that of the associated signal, in the same slot as that of the associated signal, in the same symbol as that of the associated signal, at the same carrier frequency as that of the associated signal, at the same band as that of the associated signal, in the same subcarrier as that of the associated signal, or the like. The reference signal may be used for channel compensation of the associated signal. The reference signal may be used to calculate channel information (channel state information) of the associated signal. The reference signal may be used to demodulate the associated signal. The reference signals may be categorized into a downlink reference signal (reference signal transmitted in the downlink) and an uplink reference signal (reference signal transmitted in the uplink). Each reference signal may be transmitted in common for multiple terminal apparatuses or may be transmitted individually for each terminal apparatus.

The Cyclic Prefix (CP, guard interval) may be applied to some of or all the above signals. Not that "CP is applied" may mean that a CP is transmitted, a CP is added, a CP is applied to an associated signal, or a CP for an associate signal is applied to the signal. The CPs may be categorized according to length. For example, the CPs may be categorized into an Extended CP (Long CP), a Normal CP (Regular CP), a Short CP, and the like.

A "signal" in the present embodiment can be rephrased as a radio resource, a resource, a channel, a physical channel, a logical channel, a carrier, a frequency, a carrier frequency, a band, a bandwidth, a radio wave, a signal waveform, a radio frame, a frame, a subframe, a slot, a resource block, a resource block set, a resource element, a resource element set, a symbol, a symbol set, an OFDM symbol, a DFT-S-OFDM symbol (SCFDMA symbol), a subcarrier, a subframe, a cell, a serving cell, a transport block, a Transmission Time interval (TTI), or the like.

In the present embodiment, it is apparent that a radio resource, a resource, a channel, a physical channel, a logical channel, a carrier, a frequency, a carrier frequency, a band, a bandwidth, a radio wave, a signal waveform, a radio frame, a frame, a subframe, a slot, a resource block, a resource block set, a resource element, a resource element set, a symbol, a symbol set, an OFDM symbol, a DFT-S-OFDM symbol (SCFDMA symbol), a subcarrier, a subframe, a cell, a serving cell, a transport block, a Transmission Time Interval (TTI), and the like can be rephrased as a "signal".

Some of or all the above signals may be transmitted at prescribed subcarrier spacing. The "prescribed subcarrier spacing" may be referred to as a Predefined subcarrier spacing. The "subcarrier spacing" can be rephrased as a "subcarrier bandwidth", "subcarrier band", "subcarrier frequency" or a "subcarrier spacing".

For example, the above-described prescribed subcarrier spacing may be determined based on some or all Element (1) to Element (4) below. The prescribed subcarrier spacing may be determined based on any combination of Element (1) to Element (4) below. Although "element" is used for explanation in the present embodiment, "element" can be rephrased as "condition", "requirement", "cause", "factor", or the like. "Determination" in the present embodiment can be rephrased as "configuration", "notification", "transmission", "application", or the like.

Element (1): Defined (specified) by a specification
Element (2): Explicitly configured and/or indicated
Element (3): Implicitly configured and/or indicated
Element (4): Capability information of a terminal apparatus (configured and/or indicated based on capability information of the terminal apparatus)

Element (2) may mean being configured and/or indicated based on explicitly notified information.

Element (3) may mean being configured and/or indicated based on implicitly notified information.

Elements are not limited to Element (1) to Element (4) and may use other elements than Element (1) to Element (4) or may use some of Element (1) to Element (4).

An example of a subcarrier spacing determination method based on Element (1) will be described.

"Defined (specified) by a specification" in Element (1) can be rephrased as "predefined", "predefined by a specification", "restricted by a specification", "allowed by a specification", or the like. The "specification" can be rephrased as "written specification", "standard", or "written standard".

The subcarrier spacing applicable to Element (1) may be defined by a table as in FIG. 17. The subcarrier spacing to be applied among defined subcarrier spacings may be determined based on some or all Element (1) to Element (4). For example, the terminal apparatus may identify the subcarrier spacing to be applied, by being notified by the base station apparatus of an index (index number) in the table in FIG. 17.

The subcarrier spacing applicable to Element (1) may relate to an operation mode. For example, the operation mode may be defined by a table as in FIG. 18. The operation mode to be applied may be determined based on some or all Element (1) to Element (4). For example, the terminal apparatus may identify the operation mode to be applied, by being notified by the base station apparatus of an index (index number) in the table in FIG. 18. The terminal apparatus identifying the operation mode to be applied may mean the operation mode being configured for the terminal apparatus.

The subcarrier spacing applicable to Element (1) may be more than one. In other words, the subcarrier spacing applicable to Element (1) may be defined as an "applicable subcarrier spacing set". For example, the applicable subcarrier spacing set may be managed by a table as in FIG. 19. For example, the terminal apparatus may identify the applicable subcarrier spacing set, by being notified by the base station apparatus of an index (index number) in the table in FIG. 19. The applicable subcarrier spacing may relate to an operation mode as described above. Furthermore, the applicable subcarrier spacing in the applicable subcarrier spacing set (an actually applied subcarrier spacing in the applicable subcarrier spacing set) may be determined based on some or all Element (1) to Element (4).

The applicable subcarrier spacing in Element (1) may relate to an operating band. For example, the operating band may be defined by a table as in FIG. 20. The operating band to be applied is preferably determined based on some or all Element (1) to Element (4). For example, the terminal apparatus may identify the operating band to be applied, by being notified by the base station apparatus of an index (index number, number for managing the operating band, or an index indicating the operating band number) in the table in FIG. 20. In other words, the terminal apparatus may identify the applicable subcarrier spacing, by being notified by the base station apparatus of an index in the table in FIG. 20. In other words, the terminal apparatus may (implicitly) identify the applicable subcarrier spacing, based on information indicating the configured operating band. The terminal apparatus identifying the operating band to be applied may mean the operating band being configured for the terminal apparatus, the terminal apparatus communicating using the operating band, or the like.

The subcarrier spacing applicable to one operating band may be more than one. In other words, the "applicable subcarrier spacing set" may be defined for one operating band. For example, the subcarrier spacing set applicable to one operating band may be managed by a table as in FIG. 21. For example, the terminal apparatus may identify the operating band to be applied by being notified by the base station apparatus of an index (index number, number for managing the operating band, or an index indicating the operating band number) in the table in FIG. 21. In other words, the terminal apparatus may identify the applicable subcarrier spacing set by being notified by the base station apparatus of an index in the table in FIG. 21. In other words, the terminal apparatus may (implicitly) identify the applicable subcarrier spacing set, based on information indicating the configured operating band. Furthermore, the applicable subcarrier spacing may be determined based on some or all Element (1) to Element (4) in the applicable subcarrier spacing set (actually applied subcarrier spacing in the applicable subcarrier spacing set).

The applicable subcarrier spacings may be defined independently for the uplink operating band and the downlink operating band. For example, the applicable subcarrier spacings may be managed by a table as in FIG. 24. For example, a first uplink operating band and a first downlink operating band may correspond to a first operating band, and the subcarrier spacing applicable to the first uplink operating band may be a first subcarrier spacing while a subcarrier spacing applicable to the first downlink operating band may be a second subcarrier spacing.

The applicable subcarrier spacing sets may be defined independently for the uplink operating band and the downlink operating band. For example, the applicable subcarrier spacing sets may be managed by a table as in FIG. 25. For example, the first uplink operating band and the first downlink operating band may correspond to the first operating band, and the subcarrier spacing set applicable to the first uplink operating band may be a first subcarrier spacing set while a subcarrier spacing set applicable to the first downlink operating band may be a second subcarrier spacing set. The subcarrier spacings included in the first subcarrier spacing set and the second subcarrier spacing set may overlap with each other.

For example, in a case that operating bands are managed by a table as in FIG. 20, FIG. 21, FIG. 24, or FIG. 25, the operating bands may be preferably managed by a table, and a corresponding index is given to each operating band managed by the table. The index is linked to a corresponding uplink operating band, a corresponding downlink operating band, and a duplex mode. Note that the uplink operating band is an operating band used for reception at the base station apparatus and transmission at the terminal apparatus. The downlink operating band is an operating band used for transmission at the base station apparatus and reception at the terminal apparatus. Each of the uplink operating band and the downlink operating band may be preferably given by a lower limit frequency and an upper limit frequency (associated frequency band). The duplex mode may be preferably given by TDD or FDD. The duplex mode may be other than TDD and FDD. For example, the duplex mode may be a transmission burst (optionally including at least a downlink burst or an uplink burst). The duplex mode of the table may be a Frame structure type. Frame structure type 1 is applicable to Frequency Division Duplex (FDD). Frame structure type 2 is applicable to Time Division Duplex (TDD). Frame structure type 3 is applicable to the operation of the Licensed Assisted Access (LAA) cell or the operation of the Licensed Assisted Access (LAA) secondary cell.

Although an example of notifying a subcarrier spacing to be applied based on information indicating the operating band or an applicable subcarrier set has been described, the subcarrier spacing to be applied or the applicable subcarrier spacing set may be notified based on information associated with indicating a parameter managed by a table as in FIG. 20, FIG. 21, FIG. 24, or FIG. 25. For example, information indicating an uplink operating band may be notified, and the subcarrier spacing to be applied or the applicable subcarrier spacing set may be notified based on information indicating the uplink operating band. For example, information indicating a downlink operating band is notified, and the subcarrier spacing to be applied or the applicable subcarrier spacing set may be notified based on information indicating the downlink operating band. For example, information indicating the duplex mode or a Frame structure type may be notified, and the subcarrier spacing to be applied or the applicable subcarrier spacing set may be notified based on information indicating the duplex mode or the Frame structure type.

For example, in a case that the operating bands are managed by a table as in FIG. 20, FIG. 21, FIG. 24, or FIG. 25, operating bands associated with an index "1" to an index "44" may be licensed bands (bands which are not LAA), and operating bands associated with an index "45" may be an unlicensed band (LAA band).

Although not illustrated, other operating bands may be included in FIG. 20, FIG. 21, FIG. 24, and FIG. 25. For example, operating bands associated with an index "252" to an index "255" may be unlicensed bands (LAA bands). Note that the uplink operating band is not preferably applied to the index "252" (n/a, not applicable). The 5150 MHz to 5250 Hz is preferably applied to the downlink operating band. FDD is preferably applied to the duplex mode. Furthermore, for the index "253", the uplink operating band is preferably reserved (reserved to be used in future), and the downlink operating band is preferably reserved. FDD is preferably applied to the duplex mode. Furthermore, for the index "254", the uplink operating band is preferably reserved (reserved to be used in future), and the downlink operating band is preferably reserved. FDD is preferably applied to the duplex mode. Note that the uplink operating band is not preferably applied to the index "255" (n/a, not applicable). The 5725 MHz to 5850 Hz is preferably applied to the downlink operating band. FDD is preferably applied to the duplex mode. Note that 5150 MHz to 5250 Hz and 5725 MHz to 5850 Hz are preferably unlicensed bands (LAA bands).

The "operating band" can be rephrased as a "band", a "frequency" a "carrier frequency", or the like.

The applicable subcarrier spacing may be defined in the frequency domain. In other words, the applicable subcarrier spacing may be restricted in the frequency domain. For example, the subcarrier spacing applicable to the carrier frequency may be defined by a specification. In a case that multiple subcarrier spacings are applicable to a carrier frequency, a subcarrier spacing set applicable to the carrier frequency may be defined by a specification. The "applicable subcarrier spacing set" may include all or some of subcarrier spacings applicable to the carrier frequency. The adaptable subcarrier spacing may be defined independently for each carrier frequency. The adaptable subcarrier spacing set may be defined independently for each carrier frequency.

A "carrier frequency" can be rephrased as a radio resource, a resource, a channel, a physical channel, a logical channel, a carrier, a frequency, a band, a bandwidth, a radio wave, a signal waveform, a radio frame, a frame, a sub-frame, a slot, a resource block, a resource block set, a resource element, a resource element set, a symbol, a symbol set, an OFDM symbol, a DFT-S-OFDM symbol (SCFDMA symbol), a subcarrier, a subframe, a cell, a serving cell, a transport block, a Transmission Time interval (TTI), or the like.

The applicable subcarrier spacing may be defined in the tune domain. In other words, the applicable subcarrier spacing may be restricted in the time domain. For example, the applicable subcarrier spacing may be defined by a specification, based on a unit (e.g., radio frame number, subframe number, slot number, or symbol number) defined in the time domain. In a case that multiple subcarrier spacings are applicable to the unit defined in the time domain, a subcarrier spacing set applicable to the unit defined in the time domain may be defined by a specification. The "applicable subcarrier spacing set" may include all or some of subcarrier spacings applicable to the unit defined in the time domain.

The applicable subcarrier spacing may be defined in the frequency domain and the time domain. In other words, the applicable subcarrier spacing may be restricted in the frequency domain and the time domain.

The applicable subcarrier spacing may be defined for each type of channel and/or type of communication (type of information carried by a signal). In other words, the applicable subcarrier spacing may be restricted according to each type of channel and/or communication (type of information carried by a signal).

For example, a subcarrier spacing applicable to a first channel (or a subcarrier spacing set applicable to the first channel) may be defined, a subcarrier spacing applicable to a second channel (or a subcarrier spacing set applicable to the second channel) may be defined, . . . , and a subcarrier spacing applicable to an x-th channel (or a subcarrier spacing set applicable to the x-th channel) may be defined. At least some of or all the following channels may be included in the first channel to the x-th channel.

Channel associated with transmission of downlink control information (e.g., Physical Downlink Control Channel, Enhanced Physical Downlink Control Channel)

Channel associated with transmission of uplink control information (e.g., Physical Uplink Control Channel)

Channel associated with transmission of downlink data (e.g., Physical Downlink Shared Channel)

Channel associated with transmission of uplink data (e.g., Physical Uplink Shared Channel)

Channel associated with random access (e.g., Physical Random Access Channel)

Broadcast Channel (e.g., Physical Broadcast Channel)

Channel associated with transmission of information for notification of the region in which information associated with control is transmitted (e.g., Physical Control Format Indicator Channel)

Channel associated with transmission of a HARQ indicator (HARQ feedback or response information) indicating an ACKnowledgement (ACK) or a Negative ACKnowledgement (NACK) for received data (e.g., Physical Hybrid automatic repeat request Indicator Channel)

Channel associated with multicast (e.g., Physical Multicast Channel)

The downlink data may be referred to as downlink user data, and the uplink data may be referred to as uplink user data.

The downlink data and/or uplink data may be referred to simply as data or user data.

In a case that multiple subcarrier spacings are applicable to a channel, a subcarrier spacing set applicable to the channel may be defined by a specification. The "applicable subcarrier spacing set" may include all or some of subcarrier spacings applicable to the channel.

The "applicable subcarrier spacing" may be rephrased as a "candidate for subcarrier spacing" or the like. The "applicable subcarrier spacing set" may be rephrased as a "set of candidates for subcarrier spacing" or the like.

In a case that multiple applicable subcarrier spacings are determined (case that an applicable subcarrier spacing set is determined) based on Element (1), an applicable subcarrier spacing (subcarrier spacing to be actually applied in the applicable subcarrier spacing set) may further be determined based on some or all Element (1) to Element (4).

An example of a subcarrier spacing determination method based on Element (2) will be described.

Here, Element (2) may include some of or all Element (2-1) to Element (2-5) below. Alternatively, Element (2) may be determined based on any combination of Element (2-1) to Element (2-5) below.

Element (2-1): configured and/or indicated based on higher layer information Element (2-2): configured and/or indicated based on broadcast information Element (2-3): configured and/or indicated based on information transmitted in the physical layer Element (2-4): configured and/or indicated based on information transmitted individually for each terminal apparatus Element (2-5): configured and/or indicated based on information transmitted in common for multiple terminal apparatuses Elements are not limited to Element (2-1) to Element (2-5), and may use other elements than Element (2-1) to Element (2-5) or may use some of Element (2-1) to Element (2-5).

An example of a subcarrier spacing determination method based on Element (2-1) will be described.

The "higher layer information" in Element (2-1) can be rephrased as higher layer information, information transmitted in a higher layer, information provided through higher layer signaling, higher layer signaling, a higher layer, or the like. The higher layer is preferably a layer higher than the physical layer and may be a Medium Access Control (MAC) layer or a Radio Resource Control (RRC) layer. The higher layer information may be dedicated signaling (Dedicated-signaling). The "Dedicated signaling" may be terminal apparatus dedicated signaling or Dedicated RRC signaling.

The "higher layer information" in Element (2-1) may be transmitted in the Radio Resource Control (RRC) layer by using RRC signaling or may be transmitted in the Medium Access Control (MAC) layer by using a MAC CE. Here, the RRC signaling and/or the MAC CE is also referred to as higher layer signaling. The RRC signaling and/or the MAC CE is included in a transport block.

The transport block and HARQ retransmission of the transport block are mapped to one serving cell. The transport block in the downlink may be MAC layer data transmitted on the DownLink Shared CHannel (DL-SCH).

In the uplink, "transport block", "MAC Protocol Data Unit (PDU)", "MAC layer data", "DL-SCH", "DL-SCH data", and "uplink data" are assumed to mean the same.

For example, the higher layer information may be information relating to an applicable subcarrier spacing.

For example, the higher layer information may be information relating to an applicable subcarrier spacing set.

For example, the higher layer information may be information relating to a subcarrier spacing used for signal transmission. The higher layer information can be rephrased as "information relating to a subcarrier spacing to be used for signal transmission", "information relating to a subcarrier spacing used for signal transmission", "information relating to a subcarrier spacing to be actually used for signal transmission", "information relating to a subcarrier spacing actually used for signal transmission", or the like.

For example, the higher layer information may be information based on Element (1). For example, information transmitted in a higher layer may be information defined by a specification.

The information relating to the applicable subcarrier spacing may be transmitted and/or configured independently for each carrier frequency.

In a case that multiple applicable subcarrier spacings are determined (case that an applicable subcarrier spacing set is determined) based on Element (2-1), an applicable subcarrier spacing (subcarrier spacing to be actually applied in the applicable subcarrier spacing set) may further be determined based on some or all Element (1) to Element (4).

An example of a subcarrier spacing determination method based on Element (2-2) will be described.

The "broadcast information" in Element (2-2) can be rephrased as information transmitted on a Broadcast Channel (e.g., Physical Broadcast Channel), information to be broadcast, system information, or the like. "Broadcast" may mean the same information (information used in common for multiple terminal apparatuses) being transmitted for multiple terminal apparatuses.

A Master Information Block (MIB) (Broadcast Channel (BCH)) is preferably used for "broadcast", and the Master Information Block may be transmitted on a Broadcast Channel (e.g., Physical Broadcast Channel) or a channel associated with transmission of downlink user data (e.g., Physical Downlink Shared Channel).

A System information Block (MIB) (Broadcast Channel (BCH)) is preferably used for "broadcast", and the System Information Block may be transmitted on a Broadcast Channel (e.g., Physical Broadcast Channel) or a channel associated with transmission of downlink user data (e.g., Physical Downlink Shared Channel).

The broadcast information may be transmitted on a channel associated with multicast (e.g., e.g., Physical Multicast Channel).

For example, the broadcast information may be information relating to an applicable subcarrier spacing.

For example, the broadcast information may be information relating to an applicable subcarrier spacing set.

For example, the broadcast information may be information relating to a subcarrier spacing used for signal transmission. The broadcast information can be rephrased as "information relating to a subcarrier spacing to be used for signal transmission", "information relating to subcarrier spacing used for signal transmission", "information relating to a subcarrier spacing to be actually used for signal transmission", "information relating to a subcarrier spacing actually used for signal transmission", or the like.

For example, the broadcast information may be information based on Element (1). For example, the broadcast information may be information defined by a specification.

The information relating to the applicable subcarrier spacing may be transmitted and/or configured independently for each carrier frequency.

In a case that multiple applicable subcarrier spacings are determined (case that an applicable subcarrier spacing set is determined) based on Element (2-2), an applicable subcarrier spacing (subcarrier spacing to be actually applied in the applicable subcarrier spacing set) may further be determined based on some or all Element (1) to Element (4).

An example of a subcarrier spacing determination method based on Element (2-3) will be described.

The "information transmitted in the physical layer" in Element (2-3) can be rephrased as information transmitted via physical layer signalling, information transmitted on the physical channel, information transmitted in Layer 1 (L1), L1 signalling, or the like.

The "information transmitted in the physical layer" in Element (2-3) may be transmitted on some or all the following channels.

Channel associated with transmission of downlink control information (e.g., Physical Downlink Control Channel or Enhanced Physical Downlink Control Channel)

Channel associate with transmission of uplink control information (e.g., Physical Uplink Control Channel)

Channel associated with transmission of downlink user data (e.g., Physical Downlink Shared Channel)

Channel associated with transmission of uplink user data (e.g., Physical Uplink Shared Channel)

Channel associated with random access (e.g., Physical Random Access Channel)

Broadcast Channel (e.g., Physical Broadcast Channel)

Channel associated with transmission of information for notification of the region in which information associated with control is transmitted (e.g., Physical Control Format Indicator Channel)

Channel associated with transmission of a HARQ indicator (HARQ feedback or response information) indicating an ACKnowledgement (ACK) or a Negative ACKnowledgement (HACK) for received data (e.g., Physical Hybrid automatic repeat request Indicator Channel)

Channel associated with multicast (e.g., Physical Multicast Channel)

The "channel" can be rephrased as a "signal", a "signal associated with a channel", a "signal for transmitting a channel", or the like.

For example, first information may be transmitted on some of or all the above channels. The first information may be information relating to an applicable subcarrier spacing and/or information relating to an applicable subcarrier spacing set. The first information may be information relating to a subcarrier spacing to be actually applied in the applicable subcarrier spacing set.

For example, the first information may be transmitted on some of or all the above channels, and further second information transmission may be transmitted on some of or all the above channels. The first information may be information relating to an applicable subcarrier spacing set, and the second information may be information relating to a subcarrier spacing to be actually applied in the applicable subcarrier spacing set indicated by the first information. The first information may be transmitted by using higher layer signaling, and the second information may be transmitted by using physical layer signalling.

For example, first information may be transmitted on some of or all the above channels. The first information may be downlink allocation information (downlink channel assignment information or PDSCH assignment information) or uplink assignment information (uplink channel assignment information or PUSCH assignment information), and a subcarrier spacing may be specified based on whether the first information is downlink assignment information or uplink assignment information. In other words, in a case that the first information is downlink assignment information, a first subcarrier spacing is applied to a channel assigned by the first information (downlink channel); in a case that the first information is uplink assignment information, a second subcarrier spacing is applied to a channel assigned by the first information (uplink channel). In other words, depending on whether the channel assignment information is for downlink channel assignment or not (for uplink allocation), a subcarrier spacing to be applied to a channel assigned by the information is preferably determined (specified).

The first information may be information based on Element (1). For example, the first information may be information defined by a specification.

For example, the above "first information" may be transmitted as downlink control information, "Transmitted as downlink control information" may mean being set in a field (e.g., Subcarrier-space indication field or Subcarrier-spacing indication field) defined in a format for downlink control information (e.g., Downlink Control Information Format) for transmission. The format for downlink control information may be transmitted on a channel associated with transmission of downlink control information (e.g., Physical Downlink Control Channel or Enhanced Physical Downlink Control Channel.

In a case that the first information is included in the downlink control information, the downlink control information may further include a field (Downlink assignment field) for assigning a channel associated with transmission of downlink user data (e.g., Physical DownlinkShared Channel) and/or a field (Uplink assignment field) for assigning a channel associated with transmission of uplink user data (e.g., Physical Uplink Shared Channel). The subcarrier spacing indicated by the first information may be applied to transmission of downlink user data and/or uplink data assigned by the field for assigning a channel associated with transmission of downlink user data and/or the field for assigning a channel associated with transmission of uplink user data.

In other words, a subcarrier spacing for the second channel may be determined based on the first information transmitted on the first channel. The first channel and the second channel may be the same.

In a case that multiple applicable subcarrier spacings are determined (case that an applicable subcarrier spacing set is determined) based on Element (2-3), an applicable subcarrier spacing (subcarrier spacing to be actually applied in the applicable subcarrier spacing set) may further be determined based on some or all Element (1) to Element (4).

An example of a subcarrier spacing determination method based on Element (2-4) will be described.

The "information transmitted individually for each terminal apparatus" in Element (2-4) may be information relating to an applicable subcarrier spacing.

The "information transmitted individually for each terminal apparatus" in Element (2-4) may be information relating to an applicable subcarrier spacing set.

The "information transmitted individually for each terminal apparatus" in Element (2-4) may be information relating to a subcarrier spacing to be used for signal transmission. The "information relating to a subcarrier spacing to be used for signal transmission" can be rephrased as "information relating to subcarrier spacing used for signal transmission", "information relating to a subcarrier spacing to be actually used for signal transmission", "information relating to a subcarrier spacing actually used for signal transmission", or the like.

The "information transmitted individually for each terminal apparatus" in Element (2-4) may be information based on Element (1). For example, information transmitted in a higher layer may be information defined by a specification.

In a case that multiple applicable subcarrier spacings are determined (case that an applicable subcarrier spacing set is determined) based on Element (2-4), an applicable subcarrier spacing (subcarrier spacing to be actually applied in the applicable subcarrier spacing set) may further be determined based on some or all Element (1) to Element (4).

An example of a subcarrier spacing determination method based on Element (2-5) will be described.

The "information transmitted in common for multiple terminal apparatuses" in Element (2-5) may be information relating to an applicable subcarrier spacing.

The "information transmitted in common for multiple terminal apparatuses" in Element (2-5) may be information relating to an applicable subcarrier spacing set.

The "information transmitted in common for multiple terminal apparatuses" in Element (2-5) may be information relating to a subcarrier spacing to be used for signal transmission. The "information relating to a subcarrier spacing to be used for signal transmission" can be rephrased as "information relating to subcarrier spacing used for signal transmission", "information relating to a subcarrier spacing to be actually used for signal transmission", "information relating to a subcarrier spacing actually used for signal transmission", or the like.

The "information transmitted in common for multiple terminal apparatuses" in Element (2-5) may be information based on Element (1). For example, information transmitted in a higher layer may be information defined by a specification.

In a case that multiple applicable subcarrier spacings are determined (case that an applicable subcarrier spacing set is determined) based on Element (2-5), an applicable subcarrier spacing (subcarrier spacing to be actually applied in the applicable subcarrier spacing set) may further be determined based on some or all Element (1) to Element (4).

An example of a subcarrier spacing determination method based on Element (3) will be described.

Here, Element (3) may include some of or all Element (3-1) to Element (3-6) below. Alternatively, Element (3) may be determined based on any combination of Element (3-1) to Element (3-6) below.

Element (3-1): configured and/or indicated based on information obtained by blind detection Element (3-2): configured and/or indicated based on service (based on information associated with service)

Element (3-3): configured and/or indicated based on Logical Channel ID (LCID)

Element (3-4): configured and/or indicated based on a bearer

Element 3-5): configured and/or indicated based on a band (carrier frequency)

Element (3-6): configured and/or indicated based on a signal (channel) transmission pattern Elements are not limited to Element (3-1) to Element (3-6) and may use other elements than Element (3-1) to Element (3-6) or may use some of Element (3-1) to Element (3-6).

An example of a subcarrier spacing determination method based on Element (3-1) will be described.

The "blind detection" in Element (3-1) means that information on the subcarrier spacing at which the first signal is to be transmitted is unknown to a receiver (terminal apparatus) and is detected by the receiver without any prior information (in a blind manner). The "detection" can be rephrased as "decoding", "demodulation", "sensing", or the like.

The "blind detection" in Element (3-1) means that detection of a signal (or channel) is attempted for each (monitored/possible) subcarrier candidate.

For example, the subcarrier spacing for the first signal is unknown to the terminal apparatus, and the terminal apparatus detects a subcarrier spacing for the first signal without any prior information (in a blind manner). For example, in a case that the terminal apparatus attempts to receive the first signal at multiple subcarrier spacings and successfully receives the first signal by using a certain one of the subcarrier spacings, the terminal apparatus detects (interprets) this subcarrier spacing as a subcarrier spacing used for transmission of the first signal.

Alternatively, a subcarrier spacing candidate having a possibility of being used for transmission of the first signal (or a subcarrier spacing candidate set having a possibility of being used for transmission of the first signal) may be determined and/or configured. For example, in a case that the terminal apparatus (receiver) attempts to receive the first signal by using the determined and/or configured subcarrier spacing candidates and successfully receives the first signal by using a certain subcarrier spacing, the terminal apparatus detects (interprets) this subcarrier spacing as a subcarrier spacing used for transmission of the first signal. The "subcarrier spacing candidate having a possibility of being used for transmission of the first signal (or a subcarrier spacing candidate set having a possibility of being used for transmission of the signal)" may be determined based on some of or all Element (1) to Element (4). The "subcarrier spacing candidate having a possibility of being used for transmission of the first signal (or a subcarrier spacing candidate set having a possibility of being used for transmission of the signal)" may be rephrased as a "subcarrier spacing candidate for the first signal" or the like.

A success in receiving the first signal may be determined based on Cyclic Redundancy Check (CRC) (CRC code or CRC parity bits).

In a case that the terminal apparatus that has successfully detected a subcarrier spacing for the first signal receives the first signal (attempts to receive the first signal) at another frequency and/or time, the terminal apparatus may attempt the reception by assuming that the first signal is being transmitted by using the detected subcarrier spacing.

The "first signal" can be rephrased as a "signal", an "x-th signal (where x is any number)", a "certain signal", a "specific signal", or the like.

In a case that multiple applicable subcarrier spacings are determined (case that an applicable subcarrier spacing set is determined) based on Element (3-1), an applicable subcarrier spacing (subcarrier spacing to be actually applied in the applicable subcarrier spacing set) may further be determined based on some or all Element (1) to Element (4).

An example of a subcarrier spacing determination method based on Element (3-2) will be described.

The "service" in Element (3-2) may be service in Which the terminal apparatus is interested or may be service for which the terminal apparatus is approved. The "service" can be rephrased as a "specific service", a "certain service", a "first service", an "x-th service (where x is any number)", or the like. The "service" may be different for Device to Device communication (D2D), communication between a base station and a terminal apparatus (cellular communication), Machine to Machine communication (M2M), Internet of Things (IoT), unicast transmission, multicast transmission (communication associated with MBSFN), MBSFN group, traveling speed of terminal apparatus, and the like.

For example, in a case that the terminal apparatus receives a signal associated with the first service, the signal associated with the first service is preferably received (reception of the signal is preferably attempted) by assuming that the signal is transmitted at the first subcarrier spacing. The "case that the terminal apparatus receives a signal associated with the first service" can be rephrased as a "case that the terminal apparatus receives a signal for the first service", a "case that the terminal apparatus receives a signal associated with specific service", a "case that the terminal apparatus receives a signal for specific service", or the like. The first subcarrier spacing assumed by the terminal apparatus may be determined based on some or all Element (1) to Element (4).

Alternatively, a subcarrier spacing candidate having a possibility of being used for the first service (or a subcarrier spacing candidate set having a possibility of being used for the first service) may be determined and/or configured. The "subcarrier spacing candidate having a possibility of being used for the first service (or a subcarrier spacing candidate set having a possibility of being used for the first service)" may be determined based on some of or all Element (1) to Element (4). The subcarrier spacing actually used for the first service among the subcarrier spacing candidates having a possibility of being used for the first service may be determined based on some of or all Element (1) to Element (4). "Used for the first service" may be rephrased as "used for signal transmission for the first service" or the like.

In a case that multiple applicable subcarrier spacings are determined (case that an applicable subcarrier spacing set is determined) based on Element (3-2), an applicable subcarrier spacing (subcarrier spacing to be actually applied in the applicable subcarrier spacing set) may further be determined based on some or all Element (1) to Element (4).

An example of a subcarrier spacing determination method based on Element (3-3) will be described.

The "Logical Channel ID (LCID)" in Element (3-3) may be one of constituent elements of a MAC header and may be an identifier (ID) associated with indicating (instructing) an attribute or destination of corresponding MAC data. For example, the LCID indicates whether or not the corresponding MAC data is a signal for control. For example, the LCID indicates whether or not the corresponding MAC data is a signal for data (user data). For example, the LCID indicates whether the corresponding MAC data is a signal for control or a signal for data (user data). For example, the LCID indicates whether or not the corresponding MAC data is a signal for paging.

For example, in a case that the terminal apparatus receives a MAC header including an LCID, the subcarrier spacing for the signal associated with the LCID may be determined based on the LCID. The "signal associated with the LCID" may be a signal in which the MAC data corresponding to the LCID is transmitted.

For example, in a case that the terminal apparatus receives a MAC header including an LCID, the subcarrier spacing for the signal associated with the LCID may be determined based on the attribute and/or destination of the MAC data indicated by the LCID. The "signal associated with the LCID" may be a signal in which the MAC data corresponding to the LCID is transmitted. "Based on the attribute and/or destination of the MAC data indicated by the LCID" may mean being based on the LCID indicating whether the corresponding MAC data is a signal for control or a signal for data (user data).

The subcarrier spacing for the signal associated with the LCID may be determined based on some or all Element (1) to Element (4).

Alternatively, a subcarrier spacing candidate having a possibility of being used for the signal associated with the LCID (or a subcarrier spacing candidate set having a possibility of being used for the signal associated with the LCID) may be determined and/or configured. The "subcarrier spacing candidate having a possibility of being used for the signal associated with the LCID (or a subcarrier spacing candidate set having a possibility of being used for the signal associated with the LCID)" may be determined based on some of or all Element (1) to Element (4). The subcarrier spacing to be actually used as the signal associated with the LCID among the subcarrier spacing candidates having a possibility of being used for the signal associated with the LCID may be determined based on some of or all Element (1) to Element (4).

Element (3-3) may mean being configured and/or indicated based on priority of the channel (logical channel) associated with the LCID. For example, the priority of the channel (logical channel) associated with the LCID is preferably determined based on whether the MAC data corresponding to the LCID is a signal for control or a signal for data (user data), and the signal for control may be given higher priority than that of the signal for data (user data).

In a case that multiple applicable subcarrier spacings are determined (case that an applicable subcarrier spacing set is determined) based on Element (3-3), an applicable subcarrier spacing (subcarrier spacing to be actually applied in the applicable subcarrier spacing set) may further be determined based on some or all Element (1) to Element (4).

An example of a subcarrier spacing determination method based on Element (3-4) will be described.

An example of a subcarrier spacing determination method based on Element (3-4) will be described.

Downlink data and uplink data may include Signalling Radio Bearer (SRB) data and Data Radio Bearer (DRB) data. The SRB is defined as a radio bearer used only for transmission of a Radio Resource Control (RRC) message and a Non Access Stratum (NAS) message. The DRB is defined as a radio bearer for transmitting user data.

The SRB may include SRB0, SRB1, and SRB2. SRB0 is an SRB for an RRC message using a CCCH logical channel. SRB1 is an SRB for an RRC message using a DCCH logical channel (the RRC message may include a piggy-back NAS message). SRB1 is an SRB for a NAS message using a DCCH logical channel (the NAS message is a NAS message prior to establishment of SRB2). SRB2 is an SRB for an RRC message using a DCCH logical channel (the RRC message includes logged measurement information). The logged measurement information may be measurement information regularly logged with time. SRB2 has a lower priority than that of SRB1. SRB2 is configured by an E-UTRAN after security is activated.

"Based on a bearer" in Element (3-4) may mean being based on downlink data and/or uplink data including (or being based on downlink data and/or uplink data not including) Signalling Radio Bearer (SRB) data. For example, in a case that downlink data and/or uplink data includes Signalling Radio Bearer (SRB) data, the first subcarrier spacing may be applied to transmission or reception of the downlink data and/or the uplink data. In other cases (a case that downlink data and/or uplink data does not include Signalling Radio Bearer (SRB) data or a case that downlink data and/or uplink data includes Data Radio Bearer (DRB) data), the second subcarrier spacing may be applied to transmission or reception of the downlink data and/or the uplink data.

"Based on a bearer" in Element (3-4) may mean being based on downlink data and/or uplink data including (or being based on downlink data and/or uplink data not including) Data Radio Bearer (DRB) data. For example, in a case that downlink data and/or uplink data includes Data Radio Bearer (DRB) data, the first subcarrier spacing may be applied to transmission or reception of the downlink data and/or the uplink data. In other cases (case that downlink data and/or uplink data does not include Data Radio Bearer (DRB) data or case that downlink data and/or uplink data includes Signalling Radio Bearer (SRB) data), the second subcarrier spacing may be applied to transmission or reception of the downlink data and/or the uplink data.

"Based on a bearer" in Element (3-4) may mean being based on any of SRB0, SRB1, and SRB2 included in the SRB. For example, in a case that SRB0 is included in the SRB, the first subcarrier spacing may be applied; in a case that SRB1 is included in the SRB, the second subcarrier spacing may be applied; in a case that SRB2 is included in the SRB, the third subcarrier spacing may be applied.

In a case that multiple applicable subcarrier spacings are determined (case that an applicable subcarrier spacing set is determined) based on Element (3-4), an applicable subcarrier spacing (subcarrier spacing to be actually applied in the applicable subcarrier spacing set) may further be determined based on some or all Element (1) to Element (4).

An example a subcarrier spacing determination method based on Element (3-5) will be described.

The "band (carrier frequency)" in Element (3-5) may mean band (carrier frequency) used for transmission and/or reception of some or all signals. Transmission and/or reception of some or all signals may be performed by a terminal apparatus or a base station apparatus.

The "band (carrier frequency)" in Element (3-5) may mean band (carrier frequency) having a possibility of being used for transmission and/or reception of some or all signals. An assumption of having a possibility that some or all signals are transmitted and/or received may be made by a terminal apparatus or a base station apparatus.

The "band (carrier frequency)" in Element (3-5) may mean band (carrier frequency) for which transmission and/or reception of some or all signals is assumed. An assumption (expectation) of transmission and/or reception of some or all signals may be made by a terminal apparatus or a base station apparatus. In other words, the "band (carrier frequency)" in Element (3-5) may mean a band (carrier frequency) for which transmission and/or reception of some or all signals is assumed. An assumption of transmission and/or reception of some or all signals may be made by a terminal apparatus or a base station apparatus.

"Assumption" in the present embodiment may be rephrased as "expectation", "attempt", "attempt detection", or the like.

"Transmit" in the present embodiment may be rephrased as "attempt transmission" or the like. "Receive" in the present embodiment may be rephrased as "attempt reception", "attempt detection", or the like.

The "band" in the present embodiment may be rephrased as an "operating band", and an uplink operating band and a downlink operating band may correspond to the operating band. At least a downlink operating band may correspond to the operating band. In other words, the operating band may not necessarily include an uplink operating band.

For example, in a case that the terminal apparatus receives some or all signals above at a first carrier frequency, the terminal apparatus may receive the signals by assuming that the first subcarrier spacing is applied at the first carrier frequency (a signal using the first subcarrier spacing is transmitted).

In other words, the first carrier frequency and the first subcarrier spacing may correspond to each other. In other words, the first subcarrier spacing may be applied to some or all signals above transmitted and/or received at the first carrier frequency.

For example, in a case that the terminal apparatus receives some or all signals at the first carrier frequency, the terminal apparatus may receive the signals by assuming that any of subcarrier spacings included in the first subcarrier spacing candidate set is applied at the first carrier frequency. "Any of subcarrier spacings included in the first subcarrier spacing candidate set is applied" may be determined based on some or all Element (1) to Element (4).

In other words, the first carrier frequency and the first subcarrier spacing candidate set may correspond to each other. Specifically, any one subcarrier spacing included in the first subcarrier spacing candidate set may be applied to some or all signals above transmitted and/or received at the first carrier frequency. For example, multiple subcarrier spacings may be included in the first subcarrier spacing candidate set. For example, the first subcarrier spacing to the x-th subcarrier spacing (where x is any number) may be included in the first subcarrier spacing candidate set. The subcarrier spacing actually applied among the first subcarrier spacing to the x-th subcarrier spacing (where x is any number) may be determined based on some or all Element (1) to Element (4).

An example of a subcarrier spacing determination method based on Element (3-6) will be described.

The "signal (channel) transmission pattern" in Element (3-6) may be different depending on frequency (frequency position) and/or time (time position) at which a signal is transmitted. For Example, a first signal transmitted at a first frequency and/or a first time may be a first signal transmitted in a first transmission pattern; a first signal transmitted at a second frequency and/or a second time may be a first signal transmitted in a second transmission pattern. Although "transmission" of a base station apparatus has been described here, this may be rephrased as "reception" of a terminal apparatus. In other words, "transmission" in the present embodiment may be rephrased as "reception", and a "signal (channel) transmission pattern" may be rephrased as a "signal reception pattern".

For example, in a case that the terminal apparatus has received the first signal transmitted in the first transmission pattern, the terminal apparatus may receive the second signal by assuming that the first subcarrier spacing is applied to transmission of the second signal; in a case that the terminal apparatus has received the first signal transmitted in the second transmission pattern, the terminal apparatus may receive the second signal by assuming that the second subcarrier spacing is applied to transmission of the second signal. A prescribed subcarrier spacing (predefined subcarrier spacing or subcarrier spacing defined in a written specification or the like) may be applied to the transmission of the first signal.

For example, in a case that the terminal apparatus has received a Synchronization signal transmitted in the first transmission pattern, the terminal apparatus may receive a signal for data by assuming that the first subcarrier spacing is applied to transmission of the signal for data; in a case that the terminal apparatus has received a Synchronization signal transmitted in the second transmission pattern, the terminal apparatus may receive a signal for data by assuming that the second subcarrier spacing is applied to transmission of the signal for data. A prescribed subcarrier spacing (predefined subcarrier spacing or subcarrier spacing defined in a written specification or the like) may be applied to the transmission of the Synchronization signal.

For example, in a case that the terminal apparatus has received a Synchronization signal transmitted in the first transmission pattern, the terminal apparatus may receive a signal for system information (Broadcast Channel) by assuming that the first subcarrier spacing is applied to transmission of the signal for system information; in a case that the terminal apparatus has received a Synchronization signal transmitted in the second transmission pattern, the terminal apparatus may receive a signal for system information by assuming that the second subcarrier spacing is applied to transmission of the signal for system information. A prescribed subcarrier spacing (predefined subcarrier spacing or subcarrier spacing defined in a written specification or the like) may be applied to the transmission of the Synchronization signal.

An example of a subcarrier spacing determination method based on Element (4) will be described.

The "capability information of a terminal apparatus" in Element (4) may be capability information of a terminal apparatus associated with the terminal apparatus supporting (or not supporting) specific communication. The "specific communication" may be communication (communication system) to which multiple subcarrier spacings are adaptable.

The "capability information of a terminal apparatus" in Element (4) may be capability information of a terminal apparatus associated with a subcarrier spacing.

The "capability information of a terminal apparatus" may be capability information of a terminal apparatus associated with supporting (or not supporting) transmission and/or reception using multiple subcarrier spacings. "Transmission and/or reception using multiple subcarrier spacings" may mean that multiple subcarrier spacings are applicable to signal transmission and/or reception. "Transmission and/or reception using multiple subcarrier spacings" may mean that variable subcarrier spacings are applicable to signal transmission and/or reception.

The "capability information of a terminal apparatus" may be capability information of a terminal associated with supporting (or not supporting) transmission and/or reception using a prescribed subcarrier spacing.

The above "capability information of a terminal apparatus" may indicate the number of channels (cells or component carriers) that the terminal apparatus can receive simultaneously and the subcarrier spacing corresponding to each of the channels (cells or component carriers). For example, the above "capability information of a terminal apparatus" may indicate that two channels (cells or component carriers) using the first subcarrier spacing and one channel (cell or component carrier) using the second subcarrier spacing can be received simultaneously.

The above "capability information of a terminal apparatus" may indicate the number of channels (cells or component carriers) that the terminal apparatus can transmit simultaneously and the subcarrier spacing corresponding to each of the channels. For example, the above "capability information of a terminal apparatus" may indicate that two channels (cells or component carriers) using the first subcarrier spacing and one channel (cell or component carrier) using the second subcarrier spacing can be transmitted simultaneously.

The above "capability information of a terminal apparatus" may be defined for each carrier frequency (each band). For example, the terminal apparatus may hold and transmit the "capability information of a terminal apparatus" for each carrier frequency (each band).

The above "capability information of a terminal apparatus" may be defined independently for uplink and downlink. Specifically, the above "capability information of a terminal apparatus" may be defined independently for capability information for the terminal apparatus associated with uplink communication and capability information of the terminal apparatus for downlink communication. For example, the terminal apparatus may hold and transmit the "capability information of a terminal apparatus" independently for uplink and downlink and perform transmission accordingly.

The terminal apparatus may transmit the "capability information of the terminal apparatus", based on the capability information associated with a subcarrier spacing usable for a base station or network and the subcarrier spacing supported by the terminal apparatus. The "capability information associated with a subcarrier spacing usable for a base station or network" may be broadcast by a base station apparatus or transmitted as system information.

For example, in a case that the terminal apparatus having a capability associated with transmitting and/or receiving a signal using the first to third subcarrier spacings finds out that the first subcarrier spacing and the third subcarrier spacing are the subcarrier spacings usable for a base station or network, based on the "capability information associated with a subcarrier spacing usable for a base station or network", the terminal apparatus may transmit information of having the capability associated with transmitting and/or receiving a signal using the first subcarrier spacing and the third subcarrier spacing, as the "capability information of a terminal apparatus".

The "capability information of a terminal apparatus" may be transmitted in a case of receiving a terminal capability enquiry (UECapabilityEnquiry) message from a base station.

An example of a procedure for transmitting the "capability information of a terminal apparatus" will be described.

The base station apparatus transmits a terminal capability enquiry (UECapabilityEnquiry) message to a terminal apparatus. The terminal capability enquiry message is used for requesting transmission of the radio access capability of the terminal apparatus. The terminal apparatus transmits a terminal capability information (UECapabilityInformation) message to the base station apparatus, based on the terminal capability enquiry message. The terminal capability information message is used for transmitting the radio access capability of the terminal apparatus that has been requested by the base station apparatus. The terminal capability information message includes a terminal capability (UE-EUTRA-Capability) information element. The UE-EUTRA-Capability is used to convey, to the network, the radio access capability parameter of the terminal apparatus at the base station apparatus and a Feature group indicator (FGI) for mandatory features.

The UE-DEUTRA-Capability includes at least parameters related to the radio frequency (RF-Parameters) and parameters related to the physical layer (PhyLayerParameters). The RF-Parameters includes at least a list of the bands supported by the terminal apparatus (supportedBandListEUTRA) and/or a combination of the bands supported by the terminal apparatus (supportedBandCombination). The supportedBandListEUTRA is a list of the bands (SupportedBandEUTRA) supported by the terminal apparatus. The supportedBandCombination is a list of the parameters (BandCombinationParameters) related to the combination of the bands supported by the terminal apparatus.

The SupportedBandEUTRA includes at least an indicator (FreqBandIndicator) indicating the band supported by the terminal apparatus and information (halfDulplex) indicating whether half-duplex communication or full-duplex communication is supported in the band. The number of bands in which communication is supported by the terminal apparatus is not limited. In other words, the terminal apparatus may support communication in one band only, or the terminal apparatus may support communication in multiple bands.

The BandCombinationParamaters includes parameters (BandParameters) related to each band in the combination of the bands supported by the terminal apparatus. The BandParameters includes an indicator (FreqBandIndicator) indicating the band, parameters (BandParametersUL) related to the uplink in the band, and parameters (BandParametersDL) related to the downlink in the band. The BandParametersUL is a list of the parameters (CA-MIMO-ParametersUL) related to CA and MIMO in the uplink. The BandParametersDL is a list of the parameters (CA-MIMO-ParametersDL) related to CA and MIMO in the downlink. The CA-MIMO-ParametersUL includes information (CA-BandwidthClass) indicating the CA bandwidth class in the uplink, and information (MIMO-CapabilityUL) related to the number of MIMO layers supported in the uplink. The CA-MIMO-ParametersDL includes information (CA-BandwidthClass) indicating the CA bandwidth class in the downlink, and information (MIMO-CapabilityDL) related to the number of MIMO layers supported in the downlink. The terminal apparatus explicitly includes all the supported CA bandwidth classes in the signalling related to the band combination in the CA-BandwidthClass.

In a case that multiple applicable subcarrier spacings are determined (case that an applicable subcarrier spacing set is determined) based on Element (4), an applicable subcarrier spacing (a subcarrier spacing to be actually applied in the applicable subcarrier spacing set) may further be determined based on some or all Element (1) to Element (4).

In a case that a subcarrier spacing for a signal is determined based on some of or all Element (1) to Element (4) above, a reference signal for the signal and/or a CP (CP length) for the signal may be determined based on the determined subcarrier spacing. In other words, a reference signal for the signal and/or a CP (CP length) for the signal may be determined based on the subcarrier spacing for the signal being determined. The "reference signal for the signal is determined" may mean the subcarrier spacing for the reference signal being determined. The determined CP (CP length) may be applied also to the determined reference signal.

For example, the reference signal corresponding to the subcarrier spacing (subcarrier spacing of the reference signal) and/or CP (CP length) may be defined by a specification. In other words, the reference signal corresponding to the subcarrier spacing (subcarrier spacing of the reference signal) and/or CP (CP length) for part of or entire signal may be defined by a specification.

The reference signal for the signal (subcarrier spacing of the reference signal) and/or CP (CP length) may be notified by a base station.

The reference signal for the signal (subcarrier spacing of the reference signal) and/or the CP (CP length) may be defined by a specification. For example, the reference signal for the signal (subcarrier spacing of the reference signal) and/or CP (CP length) may correspond to a carrier frequency (band). In other words, the terminal apparatus may identify the reference signal for the signal (subcarrier spacing of the reference signal) and/or the CP (CP length) by identifying the carrier frequency (band) for the signal.

A terminal apparatus according to an aspect of the present invention includes: a control unit configured to identify a subcarrier spacing set applicable to a data channel, based on a first parameter included in higher layer signaling; and a reception unit configured to receive a control channel including data channel assignment information. Based on the type of the data channel assignment information, the terminal apparatus selects, from the subcarrier spacing set, a subcarrier spacing applicable to the data channel assigned based on the data channel assignment information.

A terminal apparatus according to an aspect of the present invention is the above-described terminal apparatus, and the first parameter relates to an operating band.

A terminal apparatus according to an aspect of the present invention is the above-described terminal apparatus, and an uplink operating band and a downlink operating band correspond to the operating band, and a subcarrier spacing applicable to the uplink operating band and a subcarrier spacing applicable to the downlink operating band are defined independently.

A terminal apparatus according to an aspect of the present invention is the above-described terminal apparatus, and the type of the data channel assignment information includes a first type associated with uplink data channel assignment information and a second type associated with downlink data channel assignment information.

A terminal apparatus according to an aspect of the present invention is the above-described terminal apparatus, wherein the terminal apparatus applies a first subcarrier spacing in the applicable subcarrier spacing set to the uplink data channel in a case that the type of the data channel assignment information is the first type, while applying a second subcarrier spacing in the applicable subcarrier spacing set to the downlink data channel in a case that the type of the data channel assignment information is the second type.

A terminal apparatus according to an aspect of the present invention is the above-described terminal apparatus, and the subcarrier spacing set includes a first subset and a second subset. The terminal apparatus applies a first subcarrier spacing included in the first subset to the uplink data channel in a case that the type of the data channel assignment information is the first type, while applying a second subcarrier spacing included in the second subset to the downlink data channel in a case that the type of the data channel assignment information is the second type.

A terminal apparatus according to an aspect of the present invention is the above-described terminal apparatus, and the first subcarrier spacing and/or the second subcarrier spacing is indicated by using broadcast information, information common to multiple terminal apparatuses, information dedicated to a single terminal apparatus, physical layer information, and/or higher layer information.

A base station apparatus according to an aspect of the present invention includes: a transmission unit configured to transmit higher layer signaling including a first parameter associated with indicating a subcarrier spacing set applicable to a data channel; a transmission unit configured to transmit a control channel including data channel assignment information; and a transmission unit configured to transmit a data channel by using an applicable subcarrier spacing based on the type of the data channel assignment information. The applicable subcarrier spacing is included in the subcarrier spacing set.

A base station apparatus according to an aspect of the present invention is the above-described base station apparatus, and the first parameter relates to an operating band.

A base station apparatus according to an aspect of the present invention is the above-described base station apparatus, and an uplink operating band and a downlink operating band correspond to the operating band, and a subcarrier spacing applicable to the uplink operating band and a subcarrier spacing applicable to the downlink operating band are defined independently.

A base station apparatus according to an aspect of the present invention is the above-described base station apparatus, and the type of the data channel assignment information includes a first type associated with uplink data channel assignment information and a second type associated with downlink data channel assignment information.

A base station apparatus according to an aspect of the present invention is the above-described base station apparatus, wherein the base station apparatus applies a first subcarrier spacing in the applicable subcarrier spacing set to the uplink data channel in a case that the type of the data channel assignment information is the first type, while applying a second subcarrier spacing in the applicable subcarrier spacing set to the downlink data channel in a case that the type of the data channel assignment information is the second type.

A base station apparatus according to an aspect of the present invention is the above-described base station apparatus, and the subcarrier spacing set includes a first subset and a second subset. The base station apparatus applies a first subcarrier spacing in the first subset to the uplink data channel in a case that the type of the data channel assignment information is the first type, while applying a second subcarrier spacing in the second subset to the downlink data channel in a case that the type of the data channel assignment information is the second type.

A base station apparatus according to an aspect of the present invention is the above-described base station apparatus, and the first subcarrier spacing and/or the second subcarrier spacing is indicated by using broadcast information, information common to multiple terminal apparatuses, information dedicated to one terminal apparatus, physical layer information, and/or higher layer information.

A communication method for a terminal apparatus according to an aspect of the present invention includes the steps of: identifying a subcarrier spacing set applicable to a data channel, based on a first parameter included in higher layer signaling; receiving a control channel including data channel assignment information; and selecting, based on the type of the data channel assignment information, a subcarrier spacing applicable to the data channel associated with the data channel assignment information, from the subcarrier spacing set.

A communication method for a base station apparatus according to an aspect of the present invention includes the steps of: transmitting higher layer signaling including a first parameter associated with indicating a subcarrier spacing set applicable to a data channel; transmitting a control channel including data channel assignment information; and transmitting a data channel by using an applicable subcarrier spacing based on the type of the data channel assignment information. The applicable subcarrier spacing is included in the subcarrier spacing set.

A terminal apparatus according to an aspect of the invention includes: a reception unit configured to receive a control channel with a control information format including a first field and a second field; a reception control unit configured to identify a subcarrier spacing, based on a value of the first field; and a reception unit configured to receive a data channel assigned based on a value of the second field by using the identified subcarrier spacing.

A terminal apparatus according to an aspect of the present invention is the above-described terminal apparatus, wherein the terminal apparatus is notified of whether or not the first field is present, through higher layer signaling, and receives, in a case of being notified that the first field is present, the control information format of a payload size with the first field, while receiving, in a case of not being notified that the first field is present, the control information format of a payload size without the first field.

A terminal apparatus according to an aspect of the present invention is the above-described terminal apparatus, wherein the terminal apparatus is notified of whether or not the control channel and the data channel have different subcarrier spacings, through higher layer signaling, and receives, in a case of being notified that the control channel and the data channel have different subcarrier spacings, the control information format of a payload size with the first field, while receiving, in a case of not being notified that the control channel and the data channel have different subcarrier spacings, the control information format of a payload size without the first field.

A base station apparatus according to an aspect of the present invention includes: a transmission unit configured to transmit a control channel with a control information format including a first field and a second field; and a transmission unit configured to transmit a data channel assigned based on a value of the second field by using a subcarrier spacing based on a value of the first field.

A base station apparatus according to an aspect of the present invention is the above-described base station apparatus, wherein the base station apparatus makes notification of whether or not the first field is present, through higher layer signaling, and transmits, in a case of making notification that the first field is present, the control information format of a payload size with the first field, while transmitting, in a case of not making notification that the first field is present, the control information format of a payload size without the first field.

A base station apparatus according to an aspect of the present invention is the above-described base station apparatus, wherein the base station apparatus makes notification of whether or not the control channel and the data channel have different subcarrier spacings, through higher layer signaling, and transmits, in a case of making notification that the control channel and the data channel have different subcarrier, the control information format of a payload size with the first field, while transmitting, in a case of not making notification that the control channel and the data channel have different subcarrier spacing, the control information format of a payload size without the first field.

A communication method for a terminal apparatus according to an aspect of the invention includes the steps of: receiving a control channel with a control information format including a first field and a second field; identifying a subcarrier spacing, based on a value of the first field; and receiving a data channel assigned based on a value of the second field by using the identified subcarrier spacing.

A communication method for a base station apparatus according to an aspect of the present invention includes the steps of: transmitting a control channel with a control information format including a first field and a second field; and transmitting a data channel assigned based on a value of the second field by using a subcarrier spacing based on a value of the first field.

A terminal apparatus according to an aspect of the invention includes: a reception unit configured to receive a Synchronization signal by using a prescribed first subcarrier spacing; a reception control unit configured to identify a second subcarrier spacing to be used for transmission of a first signal, based on the received Synchronization signal; and a reception unit configured to receive the first signal by using the identified second subcarrier spacing.

A terminal apparatus according to an aspect of the present invention is the above-described terminal apparatus, and the first signal is a signal different from the signal, and the first signal is used for data transmission.

A terminal apparatus according to an aspect of the present invention is the above-described terminal apparatus, and the terminal apparatus identifies the second subcarrier spacing to be used for transmission of the first signal, based on a pattern in which the Synchronization signal is transmitted.

A terminal apparatus according to an aspect of the invention includes: a reception unit configured to receive a Synchronization signal by using a prescribed first subcarrier spacing; a reception unit configured to receive system information after synchronization based on the Synchronization signal; a reception control unit configured to identify a second subcarrier spacing to be used for transmission of a first signal, based on first information included in the system information; and a reception unit configured to receive the first signal by using the identified second subcarrier spacing.

A terminal apparatus according to an aspect. of the present invention is the above-described terminal apparatus, and the system information is received by using the first subcarrier spacing.

A terminal apparatus according to an aspect of the present invention is the above-described terminal apparatus, and the first information is information indicating an operating mode.

A communication method for a terminal apparatus according to an aspect of the invention includes the steps of: receiving a Synchronization signal by using a prescribed first subcarrier spacing; identifying a second subcarrier spacing to be used for transmission of a first signal, based on the received Synchronization signal; and receiving the first signal by using the identified second subcarrier spacing.

A communication method for a terminal apparatus according to an aspect of the present invention is the above-described communication method for a terminal apparatus, and the first signal is a signal different from the signal, and the first signal is used for data transmission.

A communication method for a terminal apparatus according to an aspect of the present invention is the above-described communication method for a terminal apparatus, and the second subcarrier spacing to be used for transmission of the first signal is identified based on a pattern in which the Synchronization signal is transmitted.

A communication method for a terminal apparatus according to an aspect of the invention includes the steps of: receiving a Synchronization signal by using a prescribed first subcarrier spacing; receiving system information after synchronization based on the Synchronization signal; identifying a second subcarrier spacing to be used for transmission of a first signal, based on first information included in the system information; and receiving the first signal by using the identified second subcarrier spacing.

A communication method for a terminal apparatus according to an aspect of the present invention is the above-described communication method for a terminal apparatus, and the system information is received by using the first subcarrier spacing.

A communication method for a terminal apparatus according to an aspect of the present invention is the above-described communication method for a terminal apparatus, and the first information is information indicating an operating mode.

A program running on each of the base station apparatus and the terminal apparatus according to the present invention may serve as a program that controls a Central Processing Unit (CPU) and the like (a program for causing a computer to operate) in such a manner as to enable the functions according to the above-described embodiment of the present invention. The information handled in these apparatuses is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus and the base station apparatus −1 or the base station apparatus −2 according to the above-described embodiments may be partially realized by the computer. In this case, this configuration may be realized by recording a program for realizing such control functions on a computer-readable recording medium and causing a computer system to read the program recorded on the recording medium for execution.

The "computer system" here is defined as a computer system built into the terminal apparatus or the base station apparatus −1 or the base station apparatus −2, and the computer system includes an OS and hardware components such as peripheral devices. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

The base station apparatus −1 or base station apparatus −2 according to the above-described embodiments can be realized as an aggregation (apparatus group) constituted of multiple apparatuses. Each of the apparatuses constituting the apparatus group may be equipped with some or all portions of each function or each functional block of the base station apparatus −1 or base station apparatus −2 according to the above-described embodiments. It is only required that the apparatus group itself include general functions or general functional blocks of the base station apparatus −1 or base station apparatus −2. Furthermore, the terminal apparatus in the above-described embodiments can also communicate with the base station apparatus as an aggregate.

Furthermore, the base station apparatus −1 or base station apparatus −2 according to the above-described embodiments may be an Evolved Universal Terrestrial Radio Access Network (EUTRAN). Furthermore, the base station apparatus −1 or base station apparatus −2 according to the above-described embodiments may have some or all portions of a function of a higher node for an eNodeB.

Furthermore, some or all portions of each of the terminal apparatus and the base station apparatus −1 or base station apparatus −2 according to the above-described embodiments may be typically achieved as a Large-Scale Integration (LSI) that is an integrated circuit or may be realized as a chip set. The functional blocks of each of the terminal apparatus and the base station apparatus −1 or base station apparatus −2 may be individually realized as a chip, or some or all of the functional blocks may be integrated into a chip. Furthermore, a circuit integration technique is not limited to the LSI, and may realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiments, a cellular mobile station apparatus is described as one example of a terminal apparatus or a communication device, but the invention of this application is not limited to this, and can be applied to a fixed-type electronic apparatus installed indoors or outdoors, or a stationary-type electronic apparatus, for example, a terminal apparatus or a communication device, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described in the embodiments is also included in the technical scope of the present invention.

CROSS-REFERENCE OF RELATED APPLICATION

This application claims the benefit of priority to JP 2016-019536 filed in Japan on Feb. 4, 2016, which is incorporated herein by reference in its entirety.

REFERENCE SIGNS LIST

2201 Higher layer
2202 Control unit
2203 Codeword generation unit
2204 Downlink subframe generation unit
2205 Downlink reference signal generation unit
2206 OFDM signal transmission unit
2207 Base station transmit antenna
2208 Base station receive antenna
2209 SC-FDMA signal reception unit
2210 Uplink subframe processing unit
2211 Uplink control information extraction unit
2301 Terminal receive antenna
2302 OFDM signal reception unit
2303 Downlink subframe processing unit
2304 Downlink reference signal extraction unit
2305 Transport block extraction unit
2306 Control unit
2307 Higher layer
2308 Channel state measurement. unit
2309 Uplink subframe generation unit
2310 Uplink control information generation unit
2311, 2312 SC-FDMA signal transmission unit
2113, 2314 Terminal transmit antenna

The invention claimed is:

1. A user equipment, comprising:
a reception circuit configured to receive a first Radio Resource Control (RRC) parameter to indicate a subcarrier spacing for a first band; and
a reception control circuit configured to identify the subcarrier spacing for the first band based on the first RRC parameter, and receive a Physical Downlink Control CHannel (PDCCH) of the identified subcarrier spacing for the first band;
wherein a first subcarrier spacing set with one or more predefined subcarrier spacing is applicable for a first frequency range,
a second subcarrier spacing set with one or more predefined subcarrier spacing is applicable for a second frequency range,
the first subcarrier spacing set is different from the second subcarrier spacing set,
the first subcarrier spacing set or the second subcarrier spacing set is identified based on a frequency range of the first band, and
the subcarrier spacing is selected from among one or more subcarrier spacings of the identified subcarrier spacing set.

2. The user equipment according to claim 1, wherein Cyclic Redundancy Check scrambled by a Temporary Cell-Radio Network Temporary identifier is added to the PDCCH.

3. A method at a user equipment, the method comprising the steps of:
receiving a first Radio Resource Control (RRC) parameter to indicate a subcarrier spacing for a first band;
identifying the subcarrier spacing for the first band based on the first RRC parameter; and
receiving a Physical Downlink Control CHannel (PDCCH) of the identified subcarrier spacing for the first band;
wherein a first subcarrier spacing set with one or more predefined subcarrier spacing is applicable for a first frequency range,
a second subcarrier spacing set with one or more predefined subcarrier spacing is applicable for a second frequency range,
the first subcarrier spacing set is different from the second subcarrier spacing set,
the first subcarrier spacing set or the second subcarrier spacing set is identified based on a frequency range of the first band, and
the subcarrier spacing is selected from among one or more subcarrier spacings of the identified subcarrier spacing set.

4. The method according to claim 3, wherein Cyclic Redundancy Check scrambled by a Temporary Network Temporary Identifier is added to the PDCCH.

5. A base station, comprising:
a transmission control circuit configured to select a subcarrier spacing for a first band, and transmit a first Radio Resource Control (RRC) parameter to indicate the subcarrier spacing; and
a transmission circuit configured to transmit a Physical Downlink Control CHannel (PDCCH) of the subcarrier spacing for the first band;
wherein a first subcarrier spacing set with one or more predefined subcarrier spacing is applicable for a first frequency range,
a second subcarrier spacing set with one or more predefined subcarrier spacing is applicable for a second frequency range,
the first subcarrier spacing set is different from the second subcarrier spacing set,
the first subcarrier spacing set or the second subcarrier spacing set is identified based on a frequency range of the first band, and the subcarrier spacing is selected from among one or more subcarrier spacings of the identified subcarrier spacing set.

6. The base station according to claim 5, wherein Cyclic Redundancy Check scrambled by a Temporary Cell-Radio Network Temporary Identifier is added to the PDCCH.

7. A method at a base station, the method comprising the steps of:

selecting a subcarrier spacing for a first band;

transmitting a first Radio Resource Control (RRC) parameter to indicate the subcarrier spacing; and transmitting a Physical Downlink Control CHannel (PDCCH) of the subcarrier spacing for the first band; and wherein a first subcarrier spacing set with one or more predefined subcarrier spacing is applicable for a first frequency range, a second subcarrier spacing set with one or more predefined subcarrier spacing is applicable for a second frequency range, the first subcarrier spacing set is different from the second subcarrier spacing set, the first subcarrier spacing set or the second subcarrier spacing set is identified based on a frequency range of the first band, and the subcarrier spacing is selected from among one or more subcarrier spacings of the identified subcarrier spacing set.

8. The method according to claim 7, wherein Cyclic Redundancy Check scrambled by a Temporary Cell-Radio Network Temporary Identifier is added to the PDCCH.

* * * * *